United States Patent
Tan et al.

(10) Patent No.: US 12,438,486 B2
(45) Date of Patent: Oct. 7, 2025

(54) MOTOR PHASE CURRENT RECONSTRUCTION

(71) Applicant: Power Integrations, Inc., San Jose, CA (US)

(72) Inventors: John Emmanuel Atienza Tan, Antipolo (PH); Emmanuel Belen Antonio, Santo Tomas (PH); Jhaebhee Mark Quiroz Calderon, Pasig (PH); John Henry Rementilla Puente, Pasay (PH)

(73) Assignee: POWER INTEGRATIONS, INC., San Jose, CA (US)

( * ) Notice: Subject to any disclaimer, the term of this patent is extended or adjusted under 35 U.S.C. 154(b) by 386 days.

(21) Appl. No.: 17/824,557

(22) Filed: May 25, 2022

(65) Prior Publication Data
US 2023/0387841 A1    Nov. 30, 2023

(51) Int. Cl.
*H02P 21/13* (2006.01)
*H02P 21/18* (2016.01)
(Continued)

(52) U.S. Cl.
CPC ............ *H02P 21/13* (2013.01); *H02P 21/18* (2016.02); *H02P 21/22* (2016.02); *H02P 21/34* (2016.02)

(58) Field of Classification Search
CPC .......... H02P 21/13; H02P 21/18; H02P 21/22; H02P 21/34; H02P 6/28
See application file for complete search history.

(56) References Cited

U.S. PATENT DOCUMENTS 6,795,321 B2    9/2004   Balakrishnan et al.
7,414,862 B2    8/2008   Park
(Continued)

FOREIGN PATENT DOCUMENTS

CN    109639210 B     6/2021
DE    102014106667 A1   4/2015
(Continued)

OTHER PUBLICATIONS

Baeurle et al., "Direct Use of Bridgeswitch Current Sense Signal Output in Field Oriented Control of Brushless DC Motors", Aug. 1, 2019, URL: https://www.power.com/sites/default/files/documents/BridgeSwitchDirectUseofPHSignalinFOC.pdf, 12 pages.
(Continued)

*Primary Examiner* — Bickey Dhakal

(57) ABSTRACT

A system controller for a motor drive system comprising a phase current reconstructor configured to perform operations. The operations comprise receiving a stator current angle and a plurality of phase current sense signals from a plurality of respective devices that in operation drive the motor drive system, selecting, based on the received stator current angle, a reference table from among a plurality of reference tables that store reconstruction scaling factors for respective phase currents, obtaining, from the selected reference table, respective reconstruction scaling factors for the respective phase currents, generating, from the obtained reconstruction scaling factors, respective reconstructed phase current magnitude values for the plurality of devices, and outputting the reconstructed phase current magnitude values.

21 Claims, 9 Drawing Sheets

(51) Int. Cl.
  *H02P 21/22* (2016.01)
  *H02P 21/34* (2016.01)

(56) References Cited

U.S. PATENT DOCUMENTS

| | | | |
|---|---|---|---|
| 7,602,228 B2 | 10/2009 | Mazzola et al. | |
| 8,269,421 B2 | 9/2012 | Vail | |
| 9,804,205 B2 | 10/2017 | Duvjnak et al. | |
| 9,966,889 B2 | 5/2018 | Zhao et al. | |
| 9,983,239 B2 | 5/2018 | Mayell | |
| 10,008,942 B1 | 6/2018 | Horwitz et al. | |
| 10,181,813 B2 | 1/2019 | Baurle et al. | |
| 10,886,870 B2 | 1/2021 | Baurle et al. | |
| 10,998,843 B2 | 5/2021 | Baeurle | |
| 11,368,148 B2 | 6/2022 | Thalheim | |
| 2010/0237817 A1* | 9/2010 | Liu | H02P 21/0007 318/400.34 |
| 2014/0333241 A1* | 11/2014 | Zhao | H02P 27/08 318/400.02 |
| 2018/0302017 A1 | 10/2018 | Baurle et al. | |
| 2018/0351497 A1* | 12/2018 | Osman | H02P 21/00 |

FOREIGN PATENT DOCUMENTS

| | | | |
|---|---|---|---|
| JP | 2001136775 A | 5/2001 | |
| JP | 2018102120 A | 6/2018 | |

OTHER PUBLICATIONS

Chakrabarti et al., "A Current Reconstruction Algorithm for Three-Phase Inverters Using Integrated Current Sensors in the Low-Side switches", IEEE Conference Record vol. 2, Oct. 12, 2003, pp. 925-932.

European Application Serial No. 23174258.6, "Communication pursuant to Rules 70(2) and 70a(2) EPC and reference to Rule 39(1) EPC mailed Dec. 11, 2023", Dec. 11, 2023, 2 pages.

European Application Serial No. 23174258.6, "Extended European Search Report mailed Nov. 6, 2023", Nov. 6, 2023, 10 pages.

Hafez, Bahaa et al., "Single-Sensor-Based Three-Phase Permanent-Magnet Synchronous Motor Drive System With Luenberger Observers for Motor Line Current Reconstruction", IEEE vol. 50, No. 4, Jul. 1, 2014, 12 pages.

Baeurle, Stefan et al., "Direct Use of BridgeSwitch Current Sense Signal Output in Field Oriented Control of Brushless DC Motors", Aug. 2019, https://www.power.com/design-support/whitepapers/direct-use-bridgeswitch-current-sense-signal-output-field-oriented-control-brushless-dc-motors, 12 pages.

Chakrabarti et al.; "A Current Reconstruction Algorithm for Three-Phase Inverters Using Integrated Current Sensors in Low-Side Switches"; IEEE, 0-7803-7883-0/03, 2003, p. 925-932.

Ramamoorthy, Ramesh T et al.; "Sensored Field Oriented Control of 3-Phase Permanent Magnet Synchronous Motor Using TMS320F2837x"; Application Report SPRABZ04; Texas Instruments; Feb. 2016; 40 pages.

Infineon; "Sensorless Field Oriented Control with Embedded Power SoC"; Z8F68474109; Mar. 9, 2020; 52 pages, Mar. 9, 2020.

Solbakken, Yngve; "Vector Control for Dummies"; https://www.switchcraft.org/learning/2016/12/16/vector-control-for-dummies; Switchraft.org; Mar. 14, 2017; 22 pages, Mar. 14, 2016.

Solbakken, Yngve; "Space Vector PWM Intro"; https://www.switchcraft.org/learning/2017/3/15/space-vector-pwm-intro; Switchcraft.org; May 1, 2017; 54 pages, May 1, 2017.

Cropley Controls Corp.; "What is 'Field-Oriented Control' and What Good is it?"; Article; May 17, 2002; 13 pages, May 17, 2002.

Zambada, Jorge; "Sensorless Field Oriented Control of PMSM Motors"; Microchip Technology Inc.; Application Note AN1078; Jun. 24, 2015; 30 pages, Jun. 24, 2015.

Lee et al.; "A Comparison Study of the Commutation Methods for the Three-Phase Permanent Magnet Brushless DC Motor"; Electrical Manufacturing Technical Conference 2009; Dec. 1, 2009; 7 pages, Dec. 1, 2009.

R, Shreepriya, et al.; "Sensorless Control of Three Phase BLDC Motor Drive with Improved Flux Observer"; IEEE, 2013 International Conference on Control Communication and Computing (ICCC), Dec. 13, 2013, pp. 292-297, Dec. 13, 2013.

Japanese Appl. No. 2023-074987; "Notification of Reasons for Refusal with Machine Translation"; Dec. 24, 2024; 9 pages.

* cited by examiner

| ANGLE $\theta_{\alpha\beta}$ | SECTOR | $\theta_{sector}$ | iw GIVEN IPHU | iv GIVEN IPHU | iu GIVEN IPHW | iv GIVEN IPHW | iu GIVEN IPHV | iw GIVEN IPHV |
|---|---|---|---|---|---|---|---|---|
| 90-149 | 0 | 90 | A | B | A' | B' | C | C' |
| 150-209 | 1 | 150 | C | C' | B | A | B' | A' |
| 210-269 | 2 | 210 | B' | A' | C' | C | A | B |
| 270-329 | 3 | 270 | A | B | A' | B' | C | C' |
| 330-359; 0-29 | 4 | 330 | C | C' | B | A | B' | A' |
| 30-89 | 5 | 30 | B' | A' | C' | C | A | B |

$\theta_{index} = \theta_{\alpha\beta} - \theta_{sector}$

| TABLE | CONTENTS |
|---|---|
| A | $\mathrm{SIN}(\theta_{index} + 120)/\mathrm{SIN}(\theta_{index})$; $\theta_{index} = 0\text{-}59$ |
| B | $\mathrm{SIN}(\theta_{index} - 120)/\mathrm{SIN}(\theta_{index})$; $\theta_{index} = 0\text{-}59$ |
| C | $\mathrm{SIN}(\theta_{index})/\mathrm{SIN}(\theta_{index} - 120)$; $\theta_{index} = 0\text{-}59$ |

| ANGLE $\theta_{\alpha\beta}$ | SECTOR | $\theta_{sector}$ | iw GIVEN IPHU | iv GIVEN IPHU | iu GIVEN IPHW | iv GIVEN IPHW | iu GIVEN IPHV | iw GIVEN IPHV |
|---|---|---|---|---|---|---|---|---|
| 90-149 | 0 | 90 | | E' | | E | | |
| 150-209 | 1 | 150 | D | D' | | | | |
| 210-269 | 2 | 210 | E | | | | | E' |
| 270-329 | 3 | 270 | | | E' | | D | D' |
| 330-359; 0-29 | 4 | 330 | | | D' | | E | |
| 30-89 | 5 | 30 | | | | D | | |

$\theta_{index} = \theta_{\alpha\beta} - \theta_{sector}$

| TABLE | CONTENTS |
|---|---|
| E | $SIN(\theta_{index} + 60)/SIN(60 - \theta_{index})$; $\theta_{index} = 0\text{-}59$ |
| D | $SIN(\theta_{index})/SIN(\theta_{index} + 60)$; $\theta_{index} = 0\text{-}59$ |

MOTOR PHASE CURRENT RECONSTRUCTION

BACKGROUND OF THE INVENTION

Field of the Invention

The present invention relates generally to motor drivers, and more specifically, related to brushless dc motor drivers.

Discussion of the Related Art

Household and industrial appliances such as ventilation fans, cooling systems, refrigerators, dishwasher, washer/dryer machines, and many other white products/goods typically utilize electric motors that transfer energy from an electrical source to a mechanical load. Electrical energy for driving the electric motors is provided through a drive system, which draws electrical energy from an electrical source (e.g., from an AC low frequency source). The electrical energy is processed through a power converter and converted to a desired form of electrical energy that is supplied to the motor to achieve the desired mechanical output. The desired mechanical output of the motor may be for example the speed of the motor, the torque, or the position of a motor shaft.

Motors and their related circuitries, such as motor drivers, represent a large portion of network loads. The functionality, efficiency, size, and price of motor drivers are challenging and competitive factors that suppliers of these products consider. The function of a power converter in a motor drive includes providing the input electrical signals to the motor, such as voltage, current, frequency, and phase, for a desired mechanical output load motion (e.g., spin/force) on the motor shaft. The power converter in one example may be an inverter transferring a dc input to an ac output of desired voltage, current, frequency, and phase. A controller of the power converter regulates the energy flow in response to signals that are received from a sensor block. The low power sensed signals from the motor or power converter are sent to the controller in a closed loop system by comparing the actual values to the desired values. The controller adjusts the output in comparison of the actual values to the desired values to maintain the target output.

Brushless dc (BLDC) motors, which are known for their higher reliability and efficiency, are becoming a popular choice in the market replacing brushed dc and motors. They are widely used in household appliances, such as refrigerators, air conditioners, vacuum cleaners, washers/driers, and other white goods, and power tools such as electric drills, or other electric tools. A BLDC motor requires a power converter, which typically includes an inverter stage as a combination of half-bridge switcher modules. A half-bridge switcher module may include power switches and control blocks inside of an integrated circuit, which provides a compact structure having a smaller size and higher efficiency.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6A is one example table for selecting the appropriate reference table for reconstructing phase currents of FIG. 5, in accordance with teachings of the present disclosure.

FIG. 6B is one example table illustrating the contents of the reference table for reconstructing phase currents of FIG. 6A, in accordance with teachings of the present disclosure.

FIG. 7A is another example table for selecting the appropriate reference table for reconstructing phase currents of FIG. 5, in accordance with teachings of the present disclosure.

FIG. 7B is another example table illustrating the contents of the reference table for reconstructing phase currents of FIG. 7A, in accordance with teachings of the present disclosure.

Figure 1A:
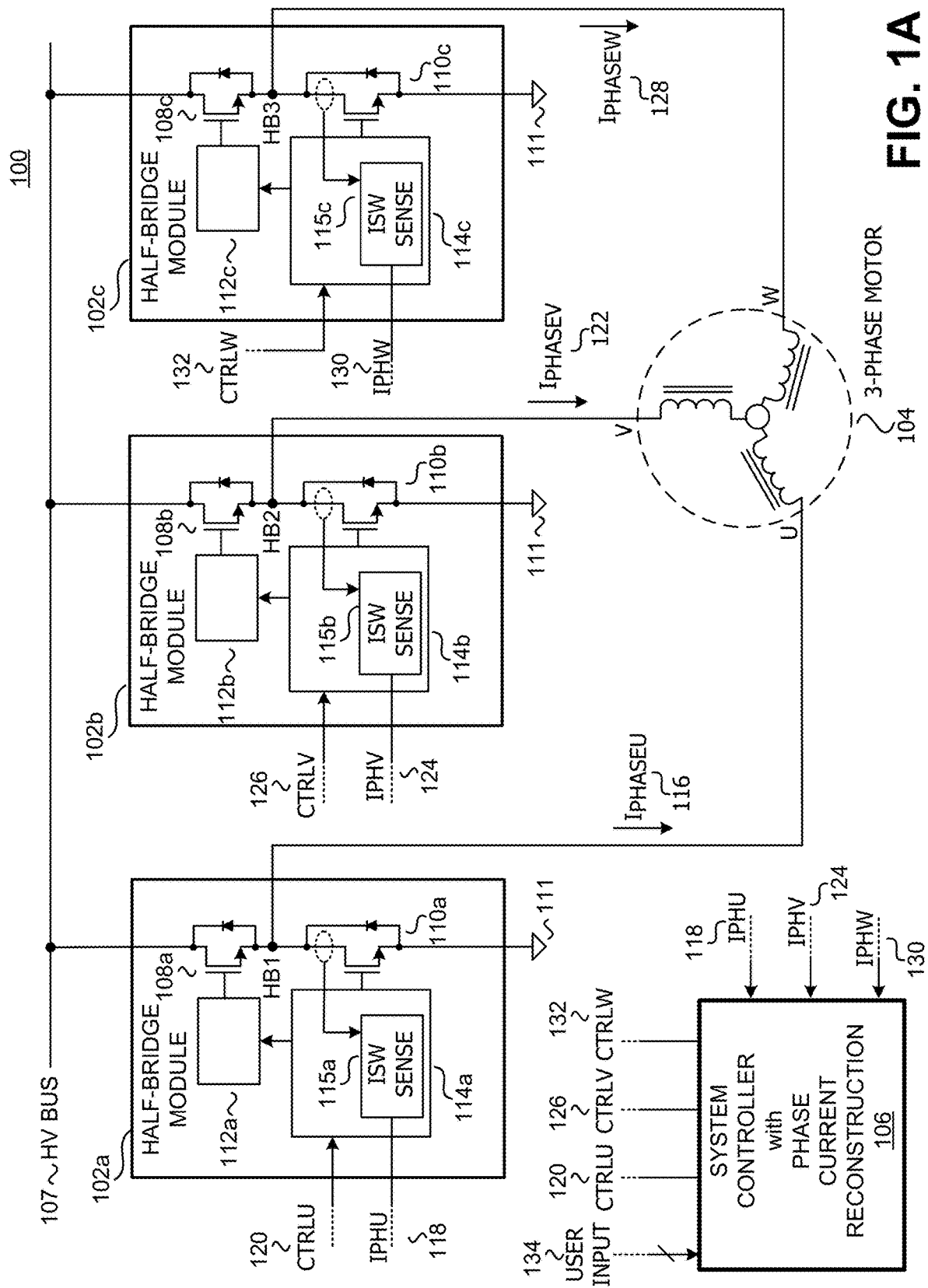
FIG. 1A illustrates an example motor drive system with phase current reconstruction for a three-phase motor, in accordance with teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Brushless dc (BLDC) motors are becoming a popular choice for replacing brushed dc and ac motors. They are widely used in household appliances, such as refrigerators, air conditioners, vacuum cleaners, washers/driers, fans, pumps and other white goods, and power tools such as electric drills, or other electric tools. A BLDC motor utilizes a power converter, which typically includes an inverter stage of one or more half-bridge modules. The half-bridge modules generally include power switches, a high-side power switch and a low-side power switch coupled in a half-bridge configuration, and their respective switch controllers to drive the power switches ON or OFF. A motor drive system for a BLDC motor also generally includes a system controller which receives sense signals regarding properties of the motor and sends control signals to the half-bridge modules to control the turn ON and turn OFF of the power switches and therefore control the desired motion of the rotor shaft of the BLDC motor.

A three-phase motor has three terminals, referred to as U, V, and W, with three windings. The windings and subsequent phases are generally referred to by the terminal they correspond with. A motor drive system for the three-phase motor utilizes a system controller and three half-bridge modules to control the magnitude and direction of the three phase currents of the motor: $I_{PHASEU}$, $I_{PHASEV}$, $I_{PHASEW}$. The system controller may employ several different control schemes, such as trapezoidal or sinusoidal commutation. For trapezoidal commutation, current is controlled through motor terminals one pair at a time, with the third motor terminally electrically disconnected. However, since motor terminals are only controlled in pairs, there are only six discreet directions which the motor may be controlled. As such, misalignment is common and control may be choppy at slow motor speeds. Sinusoidal commutation attempts to drive the three motor windings with phase currents, $I_{PHASEU}$, $I_{PHASEV}$, $I_{PHASEW}$, to be sinusoidal in shape. Feedback information of both the motor position and the phase currents along with a quick response to transients is generally necessary for sinusoidal commutation. However, at high motor speeds the transient response of sinusoidal commutation may not be sufficient, and control may significantly degrade at high motor speeds.

Field oriented control is another control scheme that could be utilized by the system controller that takes advantage of representation of the phase currents, $I_{PHASEU}$, $I_{PHASEV}$, $I_{PHASEW}$, as vectors, often referred to as current space vectors. The current space vector for a given winding has the direction representative of the magnetic field produced by that winding and a magnitude proportional to the phase current through the winding. The total stator current may be presented by a vector which is the sum of each current phase vector of each winding of the motor. Each current space vector of the three-phase motor is substantially one hundred twenty degrees (120°) apart.

For field oriented control (FOC), the current space vectors of phase currents, $I_{PHASEU}$, $I_{PHASEV}$, $I_{PHASEW}$ allows for representation of the stator current in a three-axis reference frame of the motor windings, U-axis, V-axis, and W-axis which are one hundred twenty degrees (120°) apart. The representation of the stator current vector in the three-axis reference frame can be translated to representation of the stator current vector in a two-axis reference frame of the stator, alpha-axis (α-axis) and beta-axis (β-axis) which are ninety degrees (90°) apart utilizing the Clarke transform. The stator current vector in the two-axis reference frame of the stator can be further represented in the rotating two-axis reference frame of the rotor, direct-axis (d-axis) and quadrature-axis (q-axis) which are ninety degrees (90°) apart but rotate with respect to the rotor, using the Park transform. The direct d-axis component of the stator current vector produces compression forces which does not turn the rotor while the quadrature q-axis component of the stator current vector produces torque. Proportional-integral (PI) control could then be used to minimize the direct-component and maximize the quadrature-component of the stator current vector. The outputs of the PI control are then converted back to the fixed two-axis reference frame of the stator (α and β axis which are 90° apart) and then to the three-axis reference of the motor windings. As such, a system controller utilizing FOC may have smooth motion at low speeds and efficient operation at high speeds. However, for FOC to be utilized, the system controller should receive the entirety of the phase currents $I_{PHASEU}$, $I_{PHASEV}$, $I_{PHASEW}$. One common technique for a motor drive system to measure the phase currents, $I_{PHASEU}$, $I_{PHASEV}$, $I_{PHASEW}$, is to add shunt resistors in series with the low-side switch of each leg of the half-bridge module. Additional components, such as an operational amplifier and offset components are also added for the system controller to measure the phase currents, $I_{PHASEU}$, $I_{PHASEV}$, $I_{PHASEW}$, which utilizes significant physical space, increases component count, and overall system cost.

In contrast, a BridgeSwitch™ half-bridge module includes a terminal which provides a phase current sense signal (IPH) which is proportional to the current flowing through the low-side switch of a half-bridge module and therefore proportional to a portion of the phase current. However, each of the phase current sense signals provides a portion of their respective sensed phase currents, $I_{PHASEU}$, $I_{PHASEV}$, $I_{PHASEW}$, in particular, the negative portion of the phase currents, $I_{PHASEU}$, $I_{PHASEV}$, $I_{PHASEW}$. As such, at any given point in time, all three phase currents $I_{PHASEU}$, $I_{PHASEV}$, $I_{PHASEW}$ may not be available from the phase current sense signals. To utilize FOC, the phase current should be reconstructed from the at least one phase current sense signal (IPH) that is present.

Reconstruction of the phase current has been discussed in a whitepaper titled "Direct Use of BridgeSwitch™ Current Sense Signal Output in Field Oriented Control of Brushless DC Motors," by S. Baeurle and M. Ahmed, published in August 2019 at https://www.power.com/design-support/whitepapers/direct-use-bridgeswitch-current-sense-signal-output-field-oriented-control-brushless-dc-motors, which is incorporated herein by reference in its entirety. However, the reconstruction algorithm proposed in the white paper is a combination of trigonometric calculations and division to produce a reconstruction scaling factor, which can require significant processing power for the system controller. The reconstructed phase current is substantially the product of the reconstruction scaling factor and the phase current sense signal. For example, microcontrollers, such as a 48 MHz Cortex-M0 microcontroller, are often used for the system controllers for a motor drive system. These microcontrollers generally have about 32-200 kB flash memory, about 8-16 kB of RAM, with a processing speed of about 48 MHz. These microcontrollers may be unable to perform the trigonometric calculations for current reconstruction at a speed fast enough to take advantage of FOC. For example, phase current reconstruction following the proposed process of the white paper may take approximately 836.63 μs of processing time for the microcontrollers generally used with typical motor drive systems.

For control schemes, such as field oriented control, sensing the phase currents, $I_{PHASEU}$, $I_{PHASEV}$, $I_{PHASEW}$ requires current feedback of the phase currents. At some estimations, a total of twenty-nine components which are external from the half-bridge modules are utilized to provide the current feedback of the three phase currents $I_{PHASEU}$, $I_{PHASEV}$, $I_{PHASEW}$. In contrast, embodiments of the present disclosure utilize a half-bridge module which includes a terminal which provides an internally sensed phase current sense signal (IPH) which is proportional to the current flowing through the low-side switch of a half-bridge module and therefore proportional to a portion of the phase current. As such, a single resistor per half-bridge module may be utilized to provide current feedback of the three phase currents $I_{PHASEU}$, $I_{PHASEV}$, $I_{PHASEW}$, and reduces the external component count for current feedback by ninety percent. For the traditional shunt resistor, the entire phase current flows through the resistor and the power loss due to the shunt resistor may be significant. In contrast, the internally sensed phase current sense signal (IPH) is a much smaller value than the phase current itself. For example, the phase current may be 1 ampere (A) while the phase current sense signal may be 100 μA. The traditional shunt resistor is typically a 0.22 Ohm resistor while the single resistor is generally 10 kOhm to convert the phase current sense signal to a voltage value. The power loss due to the traditional resistor is approximately 220 mW while the power loss due to the IPH phase current sense signal is approximately 0.1 mW, a 99.95% improvement in power loss.

Embodiments of the present disclosure have recognized patterns in the calculation results utilized for phase current reconstruction. In particular, embodiments of the present disclosure have recognized that several repeated patterns occur every sixty degrees (60°). As such, the three hundred sixty degrees (360°) of the phase currents can be partitioned into six sectors (Sector 0 to Sector 5) of substantially sixty-degree (60°) increments and the repeated patterns were in response to the stator current angle $\Theta_{\alpha\beta}$ of the stator current vector. As such, the repeated patterns may be represented by a reference table which allows preloading of the calculation results which decreases the processing time for phase current reconstruction. The reference tables may be indexed in response to the stator current angle $\Theta_{\alpha\beta}$ and the selection of the appropriate reference table may be in response to the stator current angle $\Theta_{\alpha\beta}$ and at least one phase current sense signal (IPH). The stator current angle $\Theta_{\alpha\beta}$ may be estimated from the alpha and beta components of the stator current vector. Further, the stored values in the reference table are representative of the reconstruction scaling factor. The reconstructed phase current is substantially the product of the reconstruction scaling factor and the available phase current sense signal. As such, in lieu of performing complicated trigonometric calculations, the system controller utilizes multiple reference tables selected in response to the phase current sense signal (IPH) and the stator current angle $\Theta_{\alpha\beta}$ to reconstruct the phase currents of the motor. Once the phase currents are reconstructed, the system controller may perform a control scheme, such as FOC, to provide the control signals to turn on and turn off various switches of the half-bridge module. As mentioned above, a microcontroller may take as much as 836.63 μs of processing time to perform the trigonometric calculations of phase current reconstruction, not including the additional amount of processing time to also determine the stator current angle $\Theta_{\alpha\beta}$. In contrast, a system controller utilizing embodiments of the presented disclosure utilizing reference tables may take approximately 2.63 μs of processing time to perform phase current reconstruction. As such, embodiments of the present disclosure may reduce the processing time for phase current reconstruction and facilitate field oriented control for motor drive systems.

FIG. 1A illustrates a multi-phase motor drive system 100 including three half-bridge inverter modules 102a, 102b, and 102c, coupled to a high-voltage (HV) bus 107 and controlled with a system controller 106 to drive a motor 104, such as for example a three-phase motor. As shown, each half-bridge inverter modules 102a, 102b, and 102c and the system controller 106 are referenced to return 111. Each half bridge module 102a, 102b, and 102c is coupled to the three phase terminals U, V, and W of the motor 104. The current for each phase/leg of the motor 104 is denoted as phase currents $I_{PHASEU}$ 116, $I_{PHASEV}$ 122, and $I_{PHASEW}$ 128. Further, each half bridge module 102a, 102b, and 102c are configured to output a phase current sense signal IPHU 118, IPHV 124, and IPHW 130, which is representative of their respective phase currents $I_{PHASEU}$ 116, $I_{PHASEV}$ 122, and $I_{PHASEW}$ 128, to the system controller 102. In one example, the system controller 102 can determine the phase currents $I_{PHASEU}$ 116, $I_{PHASEV}$ 122, and $I_{PHASEW}$ 128 from at least one phase current sense signal IPHU 118, IPHV 124, and IPHW 130, in accordance of the teachings of the present disclosure. It should be appreciated that phase current sense signal IPHU 118, IPHV 124, and IPHW 130 may be referred to as first-phase current sense signal IPHU, second-phase current sense signal IPHV, and third-phase current sense signal IPHW while phase currents $I_{PHASEU}$ 116, $I_{PHASEV}$ 122, and $I_{PHASEW}$ 128 may be referred to as first phase current $I_{PHASEU}$, second phase current $I_{PHASEV}$, and third phase current $I_{PHASEW}$.

Each half-bridge module 102a, 102b, and 102c, includes a high-side power switch 108a, 108b, 108c, and a low-side power switch 110a, 110b, 110c, respectively, coupled together as a power converter or an inverter in a half-bridge configuration. The high-side switches 108a, 108b, 108c, and a low-side switch 110a, 110b, 110c are shown as n-type metal-oxide-semiconductor field-effect transistors with their respective anti-parallel diodes. However, it should be appreciated that other transistor may be used, such as an insulated-gate bipolar transistor (IGBT), bipolar transistors, injection enhancement gate transistors (IEGTs) and gate turn-off thyristors (GTOs). In addition, half-bridge module 102a, 102b, and 102c could be used with power switches which are based on gallium nitride (GaN) semiconductors or silicon carbide (SiC) semiconductors. The half-bridge midpoint terminals HB1, HB2, HB3 between each high-side switch 108a, 108b, 108c and low-side switch 110a, 110b, 110c of their respective half-bridge modules 102a, 102b, and 102c, are coupled to the three phase terminals U, V, W of the multi-phase motor 104. In one example, the motor 104 is a brushless three-phase DC motor.

The turn ON and OFF of each high-switch power switch 108a, 108b, 108c, is controlled by its respective high-side switch controller 112a, 112b, 112c while the turn ON and turn OFF of each low-side power switch 110a, 110b, 110c is controlled by its respective low-side switch controller 114a, 114b, 114c. The switching properties of switches 108a, 108b, 108c, 112a, 112b, and 112c are controlled by their respective switch controllers to regulate the energy flow to the motor 104. In other words, the switch controllers 112a, 112b, 112c, 114a, 114b, and 114c adjust the outputs to the motor 104 to maintain the target operation of the motor 104. In operation, the half-bridge modules 102a, 102b, and 102c provide the input electrical signals (such as voltage, current, frequency, and phase for the desired mechanical output load motion) to the motor 104 from the electrical energy supplied by the HV bus 107. In one example, the half-bridge modules 102a, 102b, and 102c control the phase currents $I_{PHASEU}$ 116, $I_{PHASEV}$ 122, and $I_{PHASEW}$ 128 to control the motor 104 with to the target operation.

Half-bridge modules 102a, 102b, 102c each include a current sense circuit 115a, 115b, 115c, respectively. As shown, the low-side switch controllers 114a, 114b, 114c, each includes the current sense circuit 115a, 115b, 115c, respectively. The current sense circuit 115a, 115b, 115c are configured to receive the current of their respective low-side power switch 110a, 110b, 110c. In one example, current sense circuit 115a, 115b, 115c receives the drain current of their respective low-side power switch 110a, 110b, 110c. The drain current of the low-side power switches 110a, 110b, 110c are representative of their respective motor phase currents $I_{PHASEU}$ 116, $I_{PHASEV}$ 122, and $I_{PHASEW}$ 128 when the low-side power switches 110a, 110b, 110c are conducting. In particular, current sense circuit 115a receives the drain current of low-side power switch 110a, which is representative of phase currents $I_{PHASEU}$ 116 when low-side power switch 110a is conducting. Current sense circuit 115b receives the drain current of low-side power switch 110b, which is representative of phase currents $I_{PHASEV}$ 122 when low-side power switch 110n is conducting. Current sense circuit 115c receives the drain current of low-side power switch 110c, which is representative of phase currents $I_{PHASEW}$ 128 when low-side power switch 110c is conducting. As such, current sense circuit 115a, 115b, 115c sense the respective negative values of phase currents $I_{PHASEU}$ 116, $I_{PHASEV}$ 122, and $I_{PHASEW}$ 128.

Each current sense circuit 115a, 115b, 115c outputs their respective phase current sense signal IPHU 118, IPHV 124, IPHW 130. In one example, the phase current sense signal IPHU 118, IPHV 124, IPHW 130 are current signals. For the example shown, positive phase current is defined as current flowing from the half-bridge module to the motor. As such, the phase current sense signals IPHU 118, IPHV 124, IPHW 130 are representative of the negative values of their respective phase currents $I_{PHASEU}$ 116, $I_{PHASEV}$ 122, and $I_{PHASEW}$ 128. For example, phase current sense signal IPHU 118 is representative of the negative values of phase current $I_{PHASEU}$ 116, phase current sense signal IPHV 124 is representative of the negative values of phase current $I_{PHASEV}$ 122, and phase current sense signal IPHW 130 is representative of the negative values of phase current $I_{PHASEW}$ 128. In one example, the phase current sense signals IPHU 118, IPHV 124, IPHW 130 may be a constant value for positive values of their respective phase currents $I_{PHASEU}$ 116, $I_{PHASEV}$ 122, and $I_{PHASEW}$ 128. In one example, the constant value is substantially zero. However, in some implementations of the current sense circuits 115a, 115b, and 115c, the phase current sense signals IPHU 118, IPHV 124, IPHW 130 have a minimum non-zero output value even when no current is passing though low-side power switches 110a, 110b, 110c. However, it should be appreciated that the phase current sense signal IPHU 118, IPHV 124, IPHW 130 provides positive values for the sensed negative values of phase currents $I_{PHASEU}$ 116, $I_{PHASEV}$ 122, and $I_{PHASEW}$ 128. As such, the phase current sense signals IPHU 118, IPHV 124, IPHW 130 are substantially constant for positive values of the phase currents $I_{PHASEU}$ 116, $I_{PHASEV}$ 122, and $I_{PHASEW}$ 128, respectively, and mirror the negative values of the phase currents $I_{PHASEU}$ 116, $I_{PHASEV}$ 122, and $I_{PHASEW}$ 128, respectively.

The system controller 106 is configured to receive one or more command signals from the user input 134 to control the operation of motor 104. For example, system controller 106 may receive an "ON" command to turn on and begin operation of motor 104, or conversely, may receive an "OFF" command to stop operation of motor 106. Further command signal from user input 134 may include the desired mechanical outputs of the motor 104, such as the speed or torque. Further, the system controller 106 is also coupled to receive phase current sense signals IPHU 118, IPHV 124, IPHW 130 representative of the phase currents $I_{PHASEU}$ 116, $I_{PHASEV}$ 122, and $I_{PHASEW}$ 128 of motor 104. The system controller 106 utilizes these phase current sense signals IPHU 118, IPHV 124, IPHW 130 to control the desired mechanical output of the motor 104.

In response to command signals from the user input 134 and the phase current sense signals IPHU 118, IPHV 124, IPHW 130, the system controller 106 outputs control signals CTRLU 120, CTRLV 126, and CTRLW 132 to half-bridge modules 102a, 102b, 102c, respectively, to control the turn ON and turn OFF of high-side power switches 108a, 108b, 108c and low-side power switches 110a, 110b, 110c. In one example, control signals CTRLU 120, CTRLV 126, and CTRLW 132 are representative of a command to turn ON or turn OFF the high-side and low-side power switch of the applicable half-bridge module. In another example, control signals CTRLU 120, CTRLV 126, and CTRLW 132 may also be representative of switching properties of the respective power switches. Switching properties may include the on-time of the power switch, off-time, the duty ratio (typically the ratio of the on time of the switch to the total switching period), the switching frequency, or the number of pulses per unit time of the power switch. Further, control signals CTRLU 120, CTRLV 126, and CTRLW 132 may be voltage signals or current signals.

In one example, control signals CTRLU 120, CTRLV 126, and CTRLW 132 are rectangular pulse width waveforms with varying lengths of high and low durations. In one example, a high value for control signals CTRLU 120, CTRLV 126, and CTRLW 132 could correspond with turning ON the respective high-side switch 108a, 108b, 108c and turning OFF the respective low-side switch 110a, 110b, 110c. A low value for control signals CTRLU 120, CTRLV 126, and CTRLW 132 could correspond with turning ON the respective low-side switch 110a, 110b, 110c and turning OFF the respective high-side switch 108a, 108b, 108c. In response to the respective received control signals CTRLU 120, CTRLV 126, and CTRLW 132, high-side switch controllers 112a, 112b, 112c drive the turn ON or turn off of high-side switches 110a, 110b, 110c while low-side switch controllers 114a, 114b, 114c drive the turn ON or turn OFF of low-side switches 112a, 112b, 112c.

System controller 106 also performs phase current reconstruction in accordance with embodiments of the present disclosure. As discussed above, the received phase current sense signals IPHU 118, IPHV 124, IPHW 130 are representative of a portion of the phase currents $I_{PHASEU}$ 116, $I_{PHASEV}$ 122, and $I_{PHASEW}$ 128 of motor 104. In one example, the phase current sense signals IPHU 118, IPHV 124, IPHW 130 are substantially constant for positive values of the phase currents $I_{PHASEU}$ 116, $I_{PHASEV}$ 122, and $I_{PHASEW}$ 128, respectively, and mirror negative values of the phase currents $I_{PHASEU}$ 116, $I_{PHASEV}$ 122, and $I_{PHASEW}$ 128, respectively. Further, the phase currents $I_{PHASEU}$ 116, $I_{PHASEV}$ 122, and $I_{PHASEW}$ 128 are offset by one hundred twenty degrees (120°) from each other, and the phase current sense signals IPHU 118, IPHV 124, IPHW 130 are also offset by one hundred twenty degrees (120°) from each other. As such, there are portions of time which one or more of the phase current sense signals IPHU 118, IPHV 124, IPHW 130 are substantially equal to a constant value and do not provide information regarding their respective the phase currents $I_{PHASEU}$ 116, $I_{PHASEV}$ 122, and $I_{PHASEW}$ 128. Some control schemes which may be utilized by the system controller 106, such as field oriented control, utilizes all three phase currents $I_{PHASEU}$ 116, $I_{PHASEV}$ 122, and $I_{PHASEW}$ 128 to determine the control signals CTRLU 120, CTRLV 126, and CTRLW 132. As such, in embodiments of the present disclosure, system controller 106 includes phase current reconstruction when information regarding one or more of the phase currents $I_{PHASEU}$ 116, $I_{PHASEV}$ 122, and $I_{PHASEW}$ 128 is missing due to one or more of the phase current sense signals IPHU 118, IPHV 124, IPHW 130 substantially equaling a constant value, such as zero or a minimum output of the current sense circuit.

As will be further discussed, the system controller 106 reconstructs the phase currents $I_{PHASEU}$ 116, $I_{PHASEV}$ 122, and $I_{PHASEW}$ 128 utilizing the stator current angle $\Theta_{\alpha\beta}$ of the stator current vector and multiple reference tables. The system controller 106 further includes a stator current angle estimator which determines the stator current angle $\Theta_{\alpha\beta}$ from the alpha-component and beta-component of the stator current vector. Several patterns repeat substantially every sixty degrees (60°) for the complex trigonometric equations used for phase current reconstruction. As such, the three hundred sixty degrees (360°) of the phase currents $I_{PHASEU}$ 116, $I_{PHASEV}$ 122, and $I_{PHASEW}$ 128 can be partitioned into six sectors (Sector 0 to Sector 5) of substantially sixty degree (60°) increments and the repeated patterns are related to the stator current angle $\Theta_{\alpha\beta}$. Reference tables may be utilized to represent the patterns which allows preloading of the complex trigonometric calculation results for phase current reconstruction. In embodiments of the present disclosure, the appropriate reference table may selected in response to the estimated stator current angle $\Theta_{\alpha\beta}$ of the stator current vector and the phase current sense signals IPHU 118, IPHV 124, IPHW 130. The reference tables themselves are indexed with respect to the stator current angle $\Theta_{\alpha\beta}$ and the sector of the stator current vector. The reference tables themselves include the reconstruction scaling factor utilized to reconstruct the respective phase current. In one embodiment, reconstruction of the respective phase current is accomplished in response to the reconstruction scaling factor and one of the phase current sense signals IPHU 118, IPHV 124, IPHW 130.

Figure 1B:
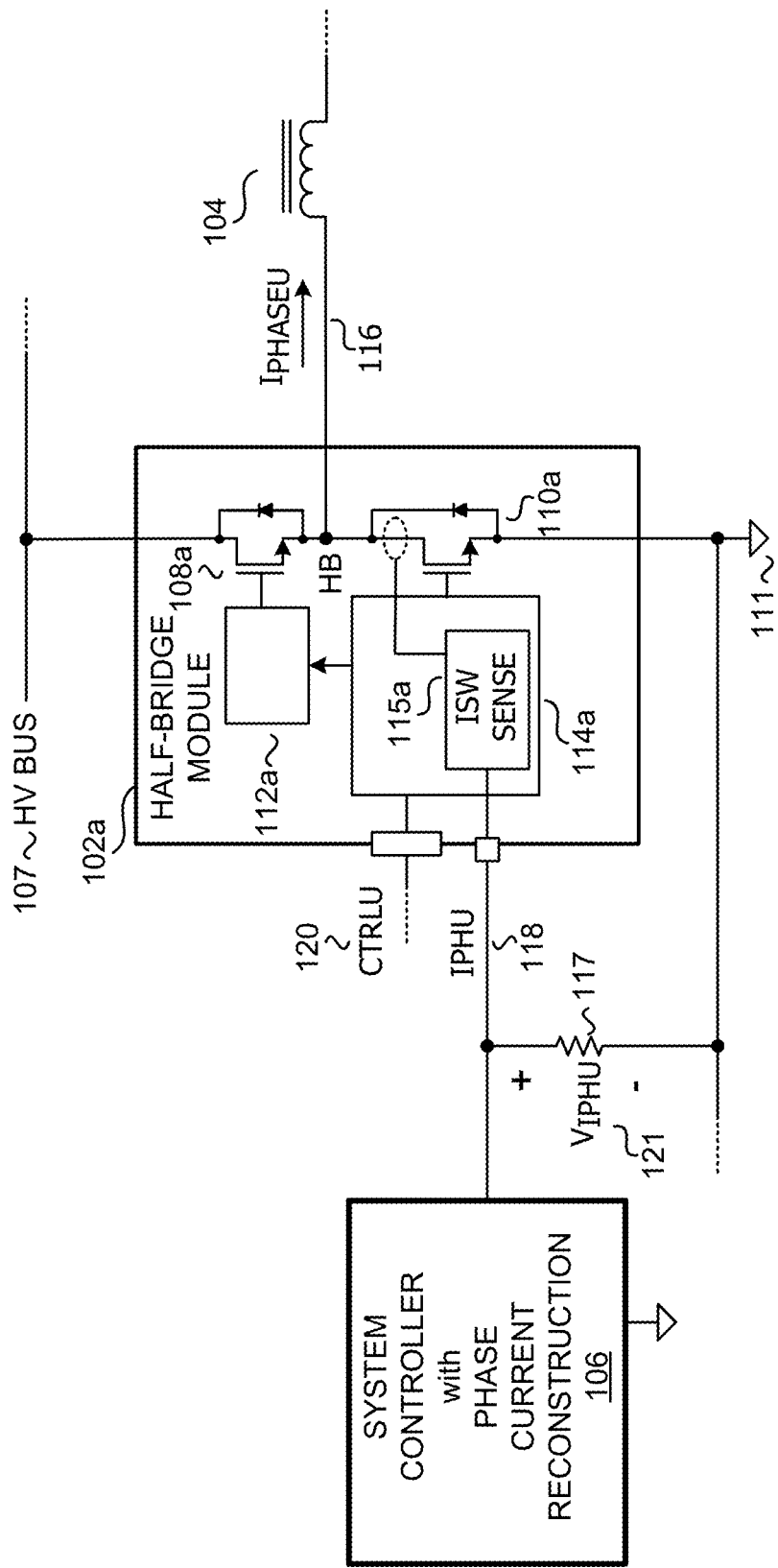
FIG. 1B illustrates one example of a half-bridge module and system controller with phase current reconstruction of FIG. 1A, in accordance with teachings of the present disclosure.

FIG. 1B illustrates one example of half-bridge module 102a coupled to provide the phase current sense signal IPHU 118 to the system controller 106. It should be appreciated that similarly named and numbered elements couple and function as described above. Further, only half-bridge module 102a is shown in FIG. 1B, but it should be appreciated that the coupling shown may also be utilized for half-bridge modules 102b and 102c.

The phase current sense signal IPHU 118 may be a current signal output by half-bridge module 102a to system controller 106. The phase current sense signal IPHU 118 is representative of the drain current of the low-side power switch 110a and the negative values of the phase current $I_{PHASEU}$ 116. Resistor 121 is coupled to return 111 and the terminal of the half-bridge module 102a which outputs the phase current sense signal IPHU 118. The current signal output of the phase current sense signal IPHU 118 may be converted to voltage signal $V_{IPHU}$ 121 via the resistor 117. It should be appreciated that only half-bridge module 102a is shown in FIG. 1B, but it should be appreciated that resistors may be utilized to convert phase current sense signals output by half-bridge modules 102b, 102c to voltage signals.

Previous techniques to provide feedback of the phase currents, $I_{PHASEU}$ 116, $I_{PHASEV}$ 122, $I_{PHASEW}$ 128, included the use of shunt resistors in series with the low-side switch 110a, 110b, 110c of each leg of the half-bridge modules 102a, 102b, 102c. Additional components, such as an operational amplifier and offset components are also added for the system controller to receive the sensed phase currents, $I_{PHASEU}$ 116, $I_{PHASEV}$ 122, $I_{PHASEW}$ 128, which utilizes significant physical space, increases component count, and overall system cost. For example, a total of twenty-nine components which are external from the half-bridge modules 102a, 102b, 102c, are utilized to provide the current feedback of the three phase currents $I_{PHASEU}$ 116, $I_{PHASEV}$ 122, $I_{PHASEW}$ 128 in previous solutions. By contrast, embodiments of the present disclosure include half-bridge modules 102a, 102b, 102c, which output phase current sense signals IPHU 118, IPHV 124, IPHW 130 representative of the drain current of the low-side power switches 110a, 110b, 110c and therefore proportional to their respective phase currents. As such, a single resistor as shown in FIG. 1B per half-bridge module 102a, 102b, 102c may be utilized to provide feedback of the three phase currents $I_{PHASEU}$, $I_{PHASEV}$, $I_{PHASEW}$, and reduces the external component count for current feedback by ninety percent. For the traditional shunt resistor, the entire phase current $I_{PHASEU}$ 116 flows through the shunt resistor and the power loss may be significant. In contrast, the internally provided phase current sense signal IPHU 118 by half-bridge module 102a is representative of the phase current $I_{PHASEU}$ 116 and is much smaller value, approximately 100 µA compared to the phase current $I_{PHASEU}$ 116 itself, which is approximately 1 A. As such, power loss due to the traditional shunt resistor may be approximately 220 mW while the power loss due to the phase current sense signal IPHU 118 may be approximately 0.1 mW, a 99.95% improvement in power loss.

Figure 2A:
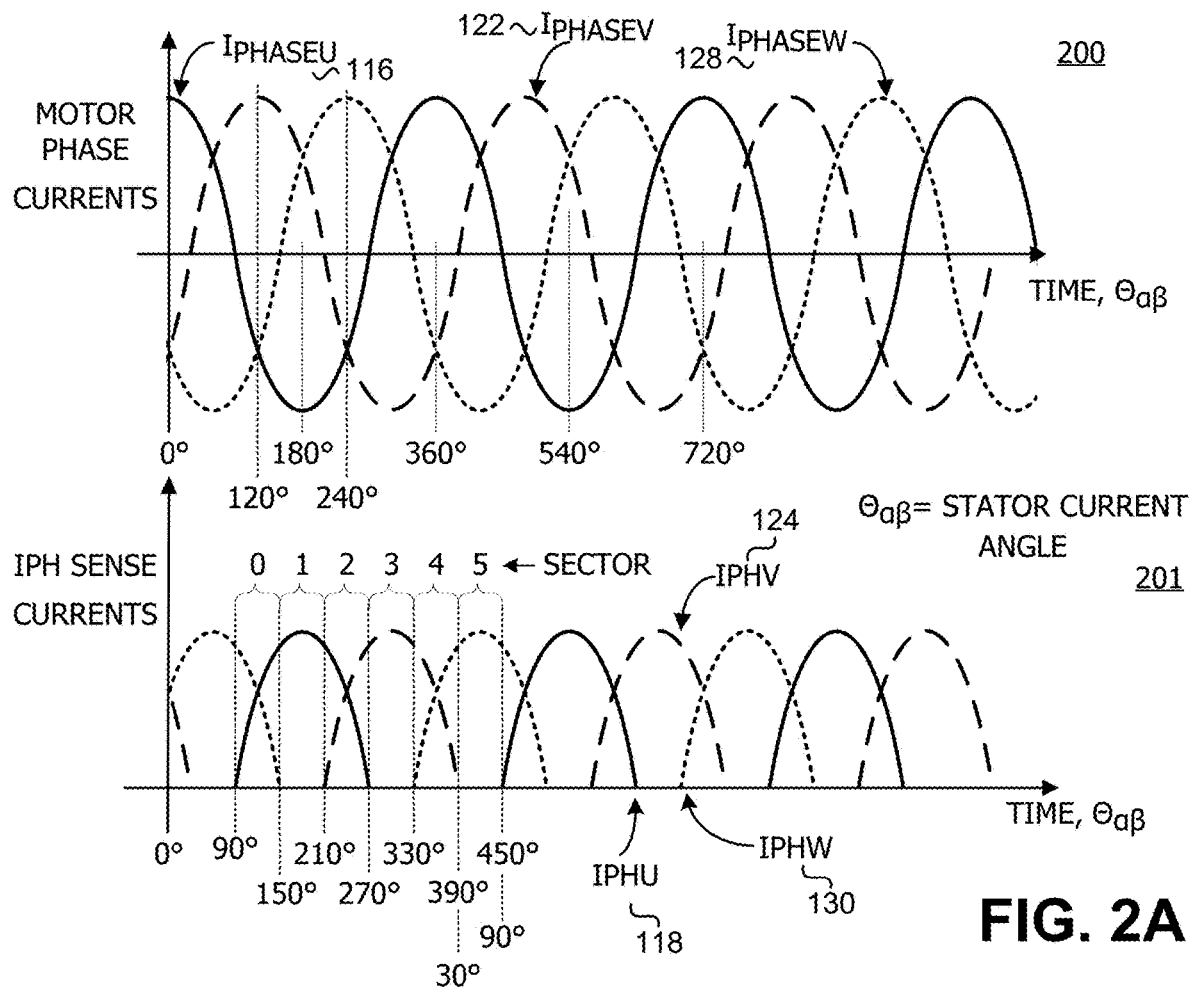
FIG. 2A illustrates diagrams of phase currents and phase current sense signals for the three-phase motor of FIG. 1A, in accordance with teachings of the present disclosure.

FIG. 2A illustrates diagram 200 of example phase currents $I_{PHASEU}$ 116, $I_{PHASEV}$ 122, and $I_{PHASEW}$ 128 and diagram 201 of the corresponding example phase current sense signals IPHU 118, IPHV 124, IPHW 130. Phase currents $I_{PHASEU}$ 116, $I_{PHASEV}$ 122, and $I_{PHASEW}$ 128 are substantially sinusoidal and shifted by one hundred twenty degrees (120°) from each other. For example, phase current $I_{PHASEV}$ 122 is shifted one hundred twenty degrees (120°) from phase current $I_{PHASEU}$ 116 while phase current $I_{PHASEW}$ 128 is shifted one hundred twenty degrees (120°) from phase current $I_{PHASEV}$ 122. As such, phase current $I_{PHASEW}$ 128 is shifted two hundred forty degrees (240°) from phase current $I_{PHASEU}$ 116. The x-axis of both diagrams 200 and 201 are representative of time and the stator current angle $\Theta_{\alpha\beta}$. As shown, at zero degrees (0°) for stator current angle $\Theta_{\alpha\beta}$ substantially corresponds to the peak positive value of the phase current $I_{PHASEU}$ 116, at one hundred twenty degrees (120°) for stator current angle $\Theta_{\alpha\beta}$ substantially corresponds to the peak positive value of phase current $I_{PHASEV}$ 122 while at two hundred forty degrees (240°) for stator current angle $\Theta_{\alpha\beta}$ substantially corresponds to the peak positive value of $I_{PHASEW}$ 128. Each of phase currents $I_{PHASEU}$ 116, $I_{PHASEV}$ 122, and $I_{PHASEW}$ 128 substantially have a period of substantially three hundred sixty degrees (360°).

Phase current sense signals IPHU 118, IPHV 124, IPHW 130 are representative of the negative values of their respective phase currents $I_{PHASEU}$ 116, $I_{PHASEV}$ 122, and $I_{PHASEW}$ 128. Further, the phase current sense signals IPHU 118, IPHV 124, IPHW 130 are substantially constant for positive values of their respective phase currents $I_{PHASEU}$ 116, $I_{PHASEV}$ 122, and $I_{PHASEW}$ 128. In one example, the constant value is substantially zero. However, in some implementations of the current sense circuits 115a, 115b, and 115c, the phase current sense signals IPHU 118, IPHV 124, IPHW 130 have a minimum non-zero output value. As such, in one example, the constant value is the non-zero output value. However, it should be appreciated that the outputted phase current sense signal IPHU 118, IPHV 124, IPHW 130 are positive for the sensed negative values of phase currents $I_{PHASEU}$ 116, $I_{PHASEV}$ 122, and $I_{PHASEW}$ 128. As such, the phase current sense signals IPHU 118, IPHV 124, IPHW 130 are substantially a constant value for positive values of the phase currents $I_{PHASEU}$ 116, $I_{PHASEV}$ 122, and $I_{PHASEW}$ 128, respectively, and mirror the negative values of the phase currents $I_{PHASEU}$ 116, $I_{PHASEV}$ 122, and $I_{PHASEW}$ 128, respectively.

As shown in diagram 201, phase current sense signal IPHU 118 is substantially the constant value from zero degrees (0°) to ninety degrees (90°). Between ninety degrees (90°) and two hundred seventy degrees (270°), the phase current sense signal IPHU 118 substantially mirrors the negative values of the phase current $I_{PHASEU}$ 116 between ninety degrees (90°) and two hundred seventy degrees (270°). Phase current sense signal IPHU 118 is substantially the constant value from two hundred seventy degrees (270°) to four hundred fifty degrees (450°).

Similarly, phase current sense signal IPHV 124 is substantially the constant value from thirty degrees (30°) to two hundred ten degrees (210°) and substantially mirrors the negative values of the phase current $I_{PHASEV}$ 122 between two hundred ten degrees (210°) and three hundred ninety degrees (390°). Phase current sense signal IPHW 130 is substantially the constant value between one hundred fifty degrees (150°) to three hundred thirty degrees (330°) and substantially mirrors the negative values of the phase current $I_{PHASEW}$ 128 between three hundred thirty degrees (330°) and five hundred ten degrees (510°). As such, the phase current sense signals IPHU 118, IPHV 124, IPHW 130 are substantially the constant value for one hundred eighty-degree (180°) sections and mirror the negative values of their respective the phase currents $I_{PHASEU}$ 116, $I_{PHASEV}$ 122, and $I_{PHASEW}$ 128 for one hundred eighty-degree (180°) sections. Phase current sense signals IPHU 118, IPHV 124, IPHW 130 also have a period of substantially three hundred sixty degrees (360°).

Shown in FIG. 2A are sectors 0 to 5. Each sector is substantially in sixty-degree (60°) increments of the stator current angle $\Theta_{\alpha\beta}$. Sector 0 corresponds with stator current angles $\Theta_{\alpha\beta}$ substantially between ninety degrees (90°) and one hundred fifty (150°) degrees. Sector 1 corresponds with stator current angles $\Theta_{\alpha\beta}$ substantially between one hundred fifty (150°) degrees and two hundred ten (210°) degrees. Sector 2 corresponds with stator current angles $\Theta_{\alpha\beta}$ substantially between two hundred ten (210°) degrees and two hundred seventy degrees (270°). Sector 3 corresponds with stator current angles $\Theta_{\alpha\beta}$ substantially between two hundred seventy degrees (270°) and three hundred thirty (330°). Sector 4 corresponds with stator current angles $\Theta_{\alpha\beta}$ substantially between three hundred thirty (330°) and three hundred ninety degrees (390). Or in other words, sector 4 corresponds with stator current angles $\Theta_{\alpha\beta}$ substantially between three hundred thirty (330°) and three hundred sixty degrees (360°) and between zero degrees (0°) and thirty degrees (30°). Sector 5 corresponds with stator current angles $\Theta_{\alpha\beta}$ substantially between thirty degrees (30°) and ninety degrees (90°).

Figure 2B:
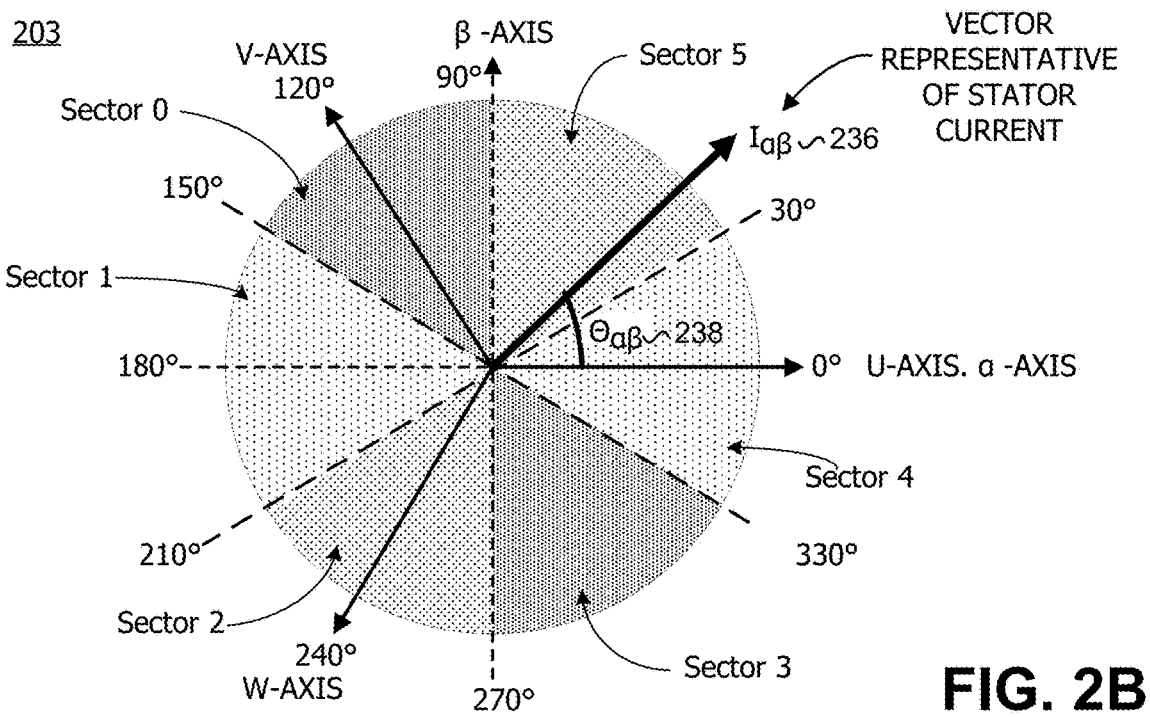
FIG. 2B illustrates a vector diagram with a two-dimensional reference axis and a three-dimensional reference axis for the motor drive system of FIG. 1A, in accordance with teachings of the present disclosure.

FIG. 2B illustrates vector diagram 203 which corresponds with the timing diagrams shown in FIG. 2A. The degree markings in FIG. 2B corresponds with stator current angle $\Theta_{\alpha\beta}$ 238, also shown with respect to FIG. 2A. The phase currents $I_{PHASEU}$ 116, $I_{PHASEV}$ 122, $I_{PHASEW}$ 128, along with their respective phase current sense signals IPHU 118, IPHV 124, IPHW 130, may be represented as vectors, often referred to as current space vectors. The current space vector for a given winding has the direction representative of the magnetic field produced by that winding and a magnitude proportional to the phase current through the winding. The total stator current may be presented by a vector which is the sum of each current phase vector of each winding of the motor. Each current space vector of the three-phase motor is substantially one hundred twenty degrees (120°) apart.

The current space vectors of phase currents, $I_{PHASEU}$, $I_{PHASEV}$, $I_{PHASEW}$ allows for representation of the stator current in a three-axis reference frame of the motor windings. The three-axis reference frame of the motor windings are generally referred to as the U-axis, V-axis, and W-axis which are each one hundred twenty (120°) apart. As shown, the U-axis corresponds with zero degrees (0°), the V-axis corresponds with one hundred twenty degrees (120°), and the W-axis corresponds with two hundred forty degrees (240°). The phase current sense signals IPHU 118, IPHV 124, IPHW 130, provide the magnitude for the respective current space vectors representative of phase currents $I_{PHASEU}$ 116, $I_{PHASEV}$ 122, $I_{PHASEW}$ 128. The direction of the current space vector representative of phase current $I_{PHASEU}$ 116 would be at zero degrees (0°), the direction of the current space vector representative of phase current $I_{PHASEV}$ 122 would be at one hundred twenty degrees (120°), and the direction of the current space vector representative of phase current $I_{PHASEW}$ 128 would be at two hundred forty degrees (240°). The individual current space vectors for each of the phase currents $I_{PHASEU}$ 116, $I_{PHASEV}$ 122, $I_{PHASEW}$ 128 may be summed together to provide the stator current vector $I_{\alpha\beta}$ 236.

The representation of the stator current vector $I_{\alpha\beta}$ 236 in the three-axis reference frame, U-axis, V-axis, and W-axis, can be translated to representation of the stator current vector $I_{\alpha\beta}$ 236 in a two-axis reference frame of the stator. The two-axis reference frame of the stator is generally referred to as the alpha-axis (a-axis) and beta-axis (β-axis) which are ninety degrees (90°) apart. As shown, the alpha-axis (a-axis) corresponds with zero degrees (0°) while the beta-axis (β-axis) corresponds with ninety degrees (90°). A three-phase to two-phase transformation, such as the Clarke transform, may be utilized to translate the representation of the stator current vector $I_{\alpha\beta}$ 236 in the three-axis reference frame (U-axis, V-axis, and W-axis) to the two-axis reference frame of the alpha-axis (a-axis) and beta-axis (β-axis).

FIG. 2B shows one example of the stator current vector $I_{\alpha\beta}$ 236 which has a magnitude and a direction. The direction may be defined by the stator current angle $\Theta_{\alpha\beta}$, which is the angular distance between the alpha-axis (a-axis) and the stator current vector $I_{\alpha\beta}$ 236. The stator current vector $I_{\alpha\beta}$ 236 may be represented by an alpha-component vector, $i_{\alpha}$, and a beta-component vector, $i_{\beta}$. The alpha-component vector $i_{\alpha}$ is substantially the projection of the stator current vector $I_{\alpha\beta}$ 236 on the alpha-axis ($\alpha$-axis) while the beta-component vector $i_{\beta}$ is substantially the projection of the stator current vector $I_{\alpha\beta}$ 236 on the beta-axis ($\beta$-axis). The sum of the alpha-component and beta-component would substantially equal the stator current vector $I_{\alpha\beta}$ 236.

Similar to FIG. 2A, the sectors 0 to 5 are shown by the shaded regions on vector diagram 203 of FIG. 2B. Each sector is substantially in sixty-degree (60°) increments of the stator current angle $\Theta_{\alpha\beta}$. Sector 0 corresponds with stator current angles $\Theta_{\alpha\beta}$ substantially between ninety degrees (90°) and one hundred fifty (150°) degrees and is shown by the heavy-density dotted region. Sector 1 corresponds with stator current angles $\Theta_{\alpha\beta}$ substantially between one hundred fifty (150°) degrees and two hundred ten (210°) degrees and is shown by the light-density dotted region. Sector 2 corresponds with stator current angles $\Theta_{\alpha\beta}$ substantially between two hundred ten (210°) degrees and two hundred seventy degrees (270°) and is shown by the medium-density dotted region. Sector 3 corresponds with stator current angles $\Theta_{\alpha\beta}$ substantially between two hundred seventy degrees (270°) and three hundred thirty (330°) and is shown by the heavy-density dotted region. Sector 4 corresponds with stator current angles $\Theta_{\alpha\beta}$ substantially between three hundred thirty (330°) and three hundred sixty degrees (360°) and between zero degrees (0°) and thirty degrees (30°) and is shown by the light-density dotted region. Sector 5 corresponds with stator current angles $\Theta_{\alpha\beta}$ substantially between thirty degrees (30°) and ninety degrees (90°) and is shown by the medium-density dotted region.

As mentioned above, the stator current vector $I_{\alpha\beta}$ 236 in the two-axis reference frame of the stator can be further represented by the rotating two-axis reference frame of the rotor. The rotating two-axis reference frame of the rotor is generally referred to as the direct-axis (d-axis) and quadrature-axis (q-axis) which are ninety degrees (90°) apart and rotate with respect to the two-axis reference frame of the stator. A stationary-to-rotating frame transformation, such as the Park transform, may be utilized to represent the stator current vector $I_{\alpha\beta}$ 236 in terms of its direct-component on the d-axis and its quadrature-component on the q-axis. The direct-component of the stator current vector $\Theta_{\alpha\beta}$ 236 produces compression forces which does not turn the rotor while the quadrature-component of the stator current vector $\Theta_{\alpha\beta}$ 236 produces torque. Proportional-integral (PI) control could be utilized to minimize the direct-component and maximize the quadrature-component of the stator current vector $\Theta_{\alpha\beta}$ 236.

As such, the representation of the phase currents $I_{PHASEU}$ 116, $I_{PHASEV}$ 122, $I_{PHASEW}$ 128 as current space vectors may allow the utilization of control schemes, such as field oriented control, by the system controller 106. However, as shown in FIG. 2A, the phase current sense signals IPHU 118, IPHV 124, IPHW 130 may not provide information regarding all of the phase currents $I_{PHASEU}$ 116, $I_{PHASEV}$ 122, $I_{PHASEW}$ 128 at the same time. For example, at substantially one hundred eighty degrees (180), only the phase current sense signal IPHU 118 is representative of its phase current $I_{PHASEU}$ 116, and as such only information regarding the phase current $I_{PHASEU}$ 116 is available to the system controller 106. As such, in embodiments of the present disclosure, system controller 106 utilizes phase current reconstruction.

In embodiments, the system controller 106 reconstructs the phase currents $I_{PHASEU}$ 116, $I_{PHASEV}$ 122, and $I_{PHASEW}$ 128 utilizing the stator current angle $\Theta_{\alpha\beta}$ 238 of the stator current vector $I_{\alpha\beta}$ 236 and multiple reference tables. The system controller 106 further includes a stator current angle estimator which determines the stator current angle $\Theta_{\alpha\beta}$ 238 from the alpha-component $i_{\alpha}$ and beta-component $i_{\beta}$ of the stator current vector $I_{\alpha\beta}$ 236. Reference tables may be utilized and allows preloading of the complex trigonometric calculation results for phase current reconstruction. In one embodiment, these complex trigonometric calculation results represent a reconstruction scaling factor. In embodiments of the present disclosure, the appropriate reference table may selected in response to the estimated stator current angle $\Theta_{\alpha\beta}$ 238 of the stator current vector $\Theta_{\alpha\beta}$ 236 and one of the phase current sense signals IPHU 118, IPHV 124, IPHW 130. The reference tables themselves are indexed with respect to the stator current angle $\Theta_{\alpha\beta}$ 238 and the sector of the stator current vector $\Theta_{\alpha\beta}$ 236. In one embodiment, the stored values in the reference tables are representative of a reconstruction scaling factor and the reconstruction of the respective phase current $I_{PHASEU}$ 116, $I_{PHASEV}$ 122, and $I_{PHASEW}$ 128 is substantially the product of the stored reconstruction scaling factor provided by the appropriate reference table and the magnitude provided by one of the phase current sense signals IPHU 118, IPHV 124, IPHW 130.

Figure 3A:
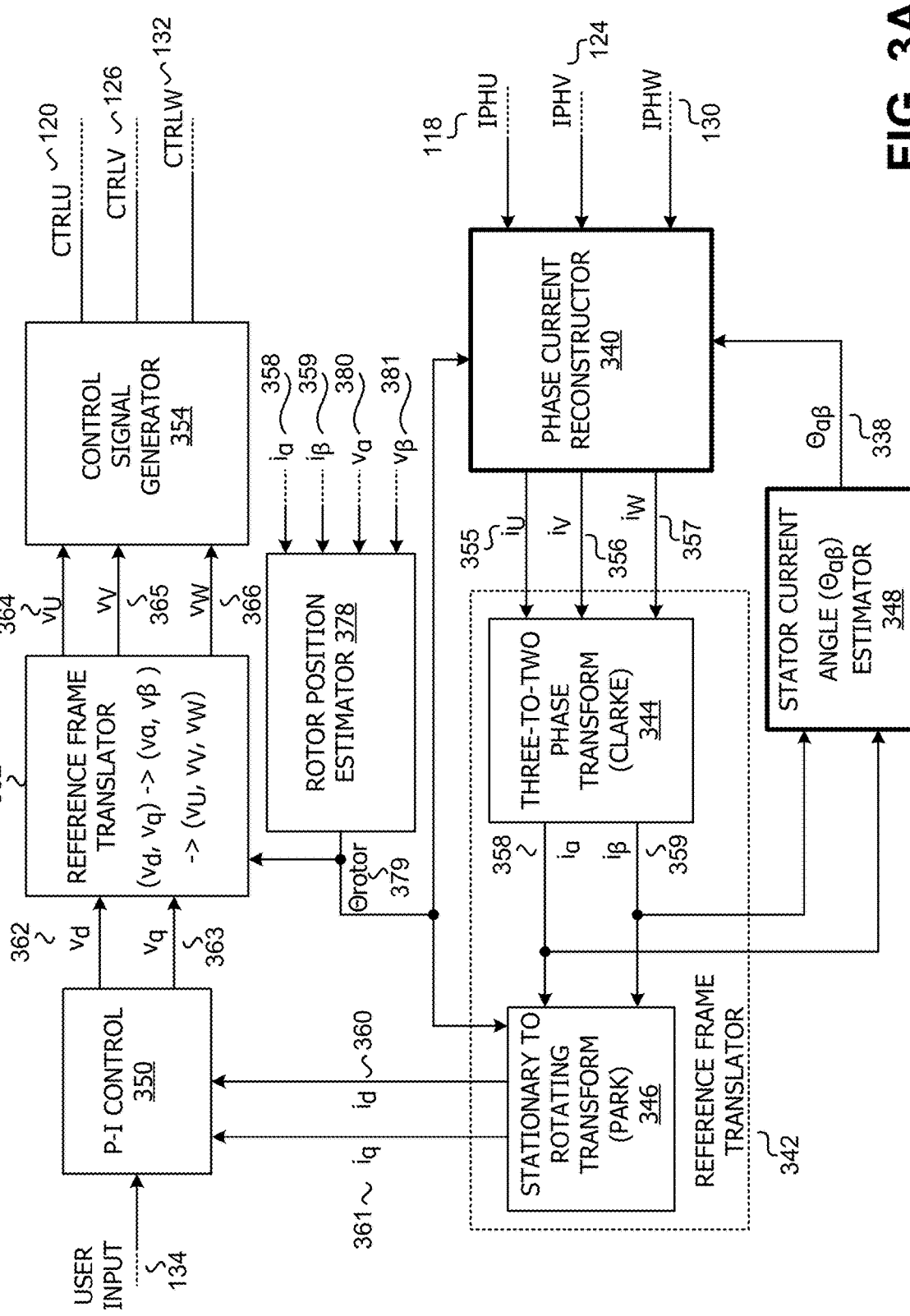
FIG. 3A is a functional block diagram of a system controller with phase current reconstruction of FIG. 1A, in accordance with teachings of the present disclosure.

FIG. 3A illustrates one example system controller 306A with a phase current reconstructor 340, in accordance with teachings of the present disclosure. System controller 306A is one example of system controller 106, further, similarly named and numbered elements couple and function as described above. System controller 306A is shown including phase current reconstructor 340, reference frame translator 342, stator current estimator 348, rotor position estimator 378, proportional integrator (P-I) control 350, reference frame translator 352, and control signal generator 354. The reference frame translator 342 is further shown as including a three-phase to two-phase transformer 344, such as the Clarke transformer 344, and a stationary-to-rotating frame transformer 346, such as the Park transformer 346. It should be appreciated that the system controller 306A shown in FIG. 3A may represent software architecture, hardware design, or a combination of both software architecture and hardware design. The system controller 306A shown in FIG. 3A implements field oriented control for the motor drive system, however, it should be appreciated that other control schemes may be utilized with the embodiments of the present disclosure. For example, a system controller utilizing sinusoidal commutation may take advantage of the reconstructed phase current magnitudes as discussed with embodiments of the present disclosure.

System controller 306A receives the phase current sense signals IPHU 118, IPHV 124, and IPHW 130 and outputs the control signals CTRLU 120, CTRLV 126, and CTROLW 132. As shown, phase current reconstructor 340 receives phase current sense signals IPHU 118, IPHV 124, and IPHW 130 and the estimated stator current angle $\Theta_{\alpha\beta}$ 338. In response to receiving the phase current sense signals IPHU 118, IPHV 124, and IPHW 130 and the estimated stator current angle $\Theta_{\alpha\beta}$ 338, the phase current reconstructor 340 reconstructs the phase currents $I_{PHASEU}$ 116, $I_{PHASEV}$ 122, and $I_{PHASEW}$ 128. The reconstructed phase currents are output by the phase current reconstructor 340 as a u-component $i_u$ 355, a v-component $i_v$ 356, and a w-component $i_w$ 357. In one embodiment, the u-component $i_u$ 355 is representative of the reconstructed magnitude of phase current $I_{PHASEU}$ 116, v-component $i_v$ 356 is representative of the reconstructed magnitude of phase current $I_{PHASEV}$ 122, and w-component $i_w$ 457 is representative of the reconstructed magnitude of phase current $I_{PHASEW}$ 128. It should be appreciated that the u-component $i_u$ 355, a v-component $i_v$ 356, and a w-component $i_w$ 357 may be referred to as the first reconstructed phase current magnitude $i_u$, second reconstructed phase current magnitude $i_v$, and third reconstructed phase current magnitude $i_w$.

Phase current reconstructor 340 includes at least one reference table with preloaded values representative of reconstruction scaling factors. In one embodiment, the reconstructed phase current magnitudes, u-component $i_u$ 355, v-component $i_v$ 356, and w-component $i_w$ 357, may be substantially the product of the appropriate stored reconstruction scaling factor and the magnitude provided by one of the phase current sense signals IPHU 118, IPHV 124, or IPHW 130. Each reference table includes sixty values and the selection of the appropriate value to be outputted for the reconstruction scaling factor of the u-component $i_u$ 355, v-component 356, and w-component $i_u$ 357 is in response to the estimated stator current angle $\Theta_{\alpha\beta}$ 338. Further, the preloaded values are computed based on the stator current angle $\Theta_{\alpha\beta}$ 338 and representative of the reconstruction scaling factor. As such, the reference tables are indexed with respect to the stator current angle $\Theta_{\alpha\beta}$ 338. In embodiments of the present disclosure, the appropriate reference table may be selected in response to the estimated stator current angle $\Theta_{\alpha\beta}$ 338 and the phase current sense signals IPHU 118, IPHV 124, IPHW 130. As will be further discussed, the reference table may be selected in response to the estimated stator current angle $\Theta_{\alpha\beta}$ 338 and which of the received phase current sense signals IPHU 118, IPHV 124, IPHW 130 is available. The received phase current sense signals IPHU 118, IPHV 124, IPHW 130 may be considered available or present if the received phase current sense signals IPHU 118, IPHV 124, IPHW 130 is greater than a threshold UMIN, VMIN, or WMIN, respectively. It should be appreciated that thresholds UMIN, VMIN, or WMIN may be referred to as the first threshold UMIN, second threshold VMIN and third threshold WMIN. In one example, the value of thresholds UMIN, VMIN, or WMIN are substantially equal. Reference frame translator 342 translates the reconstructed phase current magnitudes, u-component $i_u$ 355, v-component $i_v$ 356, and w-component $i_w$ 357 from the three-axis reference frame of the motor windings to the corresponding direct-component $i_d$ 360 and quadrature-component $i_q$ 361 related to the rotating two-axis reference frame of the rotor. As shown, the three-phase to two-phase transformer 344, e.g. Clarke transformer 344, of reference frame translator 342 receives the u-component $i_u$ 355, v-component 356, and w-component $i_w$ 357 and outputs the alpha-component $i_\alpha$ 358 and beta-component $i_\beta$ 359 related to the two-axis reference frame of the stator. The alpha-component $i_\alpha$ 358 and beta-component $i_\beta$ 359 are the magnitudes of the projection of the stator current vector $\Theta_{\alpha\beta}$ on the α-axis and β-axis, respectively. In one example operation, three-phase to two-phase transformer 344, Clarke transformer 344, performs the Clarke transformation to the u-component $i_u$ 355, v-component $i_v$ 356, and w-component $i_w$ 357 to output the alpha-component $i_\alpha$ 358 and beta-component $i_\beta$ 359.

Stator current angle estimator 348 receives the alpha-component $i_\alpha$ 358 and beta-component $i_\beta$ 359 and outputs the estimated stator current angle $\Theta_{\alpha\beta}$ 338. As mentioned above, the summation of the alpha-component $i_\alpha$ 358 and beta-component $i_\beta$ 359 results in the stator current vector $I_{\alpha\beta}$ 236. As such, the stator current angle $\Theta_{\alpha\beta}$ 338 may be derived from the alpha-component $i_\alpha$ 358 and beta-component $i_\beta$ 359. In one example, and further shown with respect to FIG. 4, a phase-locked loop (PLL) may be utilized to determine the estimated stator current angle $\Theta_{\alpha\beta}$ 338 from the alpha-component $i_\alpha$ 358 and beta-component $i_\beta$ 359. However, it should be appreciated that other angle estimators may be utilized. For example, an arctangent angle estimator utilizing the standard C library or an arctangent angle estimator utilizing special hardware.

Rotor position estimator 378 is also coupled to receive the alpha-component $i_\alpha$ 358 and beta-component $i_\beta$ 359 and outputs the rotor angle Σrotor 379. In one example, the rotor position estimator 378 determines the angular position of the rotor flux vector (e.g. rotor angle Σrotor 379). In one example of the present disclosure, the system controller 306A is sensorless and does not use an external sensor to determine the position of the rotor. As such, the system controller 306A includes the rotor position estimator 378. In one example, the rotor position estimator 378 determines the rotor angle Θrotor 379 in response to the alpha-component $i_\alpha$ 358 and beta-component $i_\beta$ 359, along with the control signals $v_\alpha$ 380 and $v_\beta$ 381 produced by the reference frame translator 352. As will be further discussed, control signal $v_\alpha$ 380 is outputted to regulate the alpha-component $i_\alpha$ 358 while the control signal $v_\beta$ 381 is outputted to regulate the beta-component $i_\beta$ 359 to the desired values. Although, it should be appreciated that embodiments of the present disclosure may be implemented external rotor position sensors. In one embodiment, the rotor flux vector is substantially ninety degrees (90°) behind the stator current vector $I_{\alpha\beta}$ 236.

The stator current angle estimator 348 may need time to initialize to provide a more accurate estimated stator current angle $\Theta_{\alpha\beta}$ 338. In particular, the stator current angle estimator 348 may be initialized during a start-up operation of the motor drive system and system controller 306A. However, the rotor flux vector is substantially ninety degrees (90°) behind the stator current vector $I_{\alpha\beta}$ 236. As such, during the start-up operation, the phase current reconstructor 340 may utilize the rotor angle Θrotor 379 to determine the stator current angle $\Theta_{\alpha\beta}$ 338 rather than the estimated stator current angle $\Theta_{\alpha\beta}$ 338 provided by the stator current angle estimator 348. In the embodiment shown, the phase current reconstructor 340 receives the rotor angle Θrotor 379. During the start-up operation, the phase current reconstructor 340 determines that the stator current angle $\Theta_{\alpha\beta}$ 338 is substantially the sum of the rotor angle Θrotor 379 and a preset offset angle Θangle. In one example, the preset offset angle Σangle is substantially ninety degrees (90°). As such, during the start-up operation, the stator current angle $\Theta_{\alpha\beta}$ 338 varies between zero degrees (0°) and three hundred sixty degrees (360°) at a predetermined rate to output the u-component $i_u$ 355, v-component 356, and w-component $i_w$ 357. Once start-up operation is completed, the phase current reconstructor 340 utilizes the estimated stator current angle $\Theta_{\alpha\beta}$ 338 provided by the stator current angle estimator 348.

A stationary-to-rotating frame transformer 346, e.g. the Park transformer 346, receives the alpha-component $i_\alpha$ 358, beta-component $i_\beta$ 359 corresponding to the fixed two-axis reference frame of the stator, and the rotor angle Θrotor 379, and outputs the direct-component $i_d$ 360 and quadrature-component $i_q$ 361 corresponding to the rotating two-axis reference frame of the rotor. In one example operation, the stationary-to-rotating frame transformer 346, e.g. Park transformer 346, performs the Park transformation to the alpha-component $i_\alpha$ 358 and beta-component $i_\beta$ 359 to output the direct-component $i_d$ 360 and quadrature-component $i_q$ 361.

P-I control block 350 receives the direct-component $i_d$ 360 and quadrature-component $i_q$ 361 and outputs the control signal $v_d$ 362 and control signal $v_q$ 363. The P-I control block 350 also receives user input 134. In one embodiment, user input 134 is representative of the desired mechanical output of the motor, such as the speed, the torque, or the position of the motor. In one example, the user input 134 may be representative of the torque of the motor. The direct-component $i_d$ 360 is representative of compression forces of the motor while the quadrature-component $i_q$ 361 is representative of the torque of the motor. The P-I control block 350 may utilize two P-I controllers, one each for the direct-component $i_d$ 360 and the quadrature-component $i_q$ 361. In operation, one P-I controller of the P-I control block 350 determines the value for the control signal $v_d$ 362 such that the direct-component $i_d$ 360 is regulated to a desire value. As such, the control signal $v_d$ 362 is representative of the regulation of the direct-component $i_d$ 360 to the desired value. In one embodiment, the P-I control block 350 minimizes the direct-component $i_d$ 360 to substantially zero. The other P-I controller of the P-I control block 350 determines the value for the control signal $v_q$ 363 such that the quadrature-component $i_q$ 361 is regulated to the desired torque of the motor indicated by the user input 134. As such, the control signal $v_q$ 363 is representative of the regulation of the quadrature-component $i_q$ 361 to the desired value.

Reference frame translator 352 receives the control signal $v_d$ 362 and control signal $v_q$ 363 and outputs the control signal $v_U$ 364, control signal $v_V$ 365, and the control signal $v_W$ 366. Reference frame translator 352 translates the control signal $v_d$ 362 and control signal $v_q$ 363 of the rotating two-axis reference frame of the rotor to the corresponding control signal $v_U$ 364, control signal $v_V$ 365, and the control signal $v_W$ 366 of the three-axis reference frame of the motor windings. In one example, the reference frame translator 352 could perform the inverse Park transform followed by the inverse Clarke transform to output the control signal $v_U$ 364, control signal $v_V$ 365, and the control signal $v_W$ 366. However, it should be appreciated that there are other techniques for determining the corresponding control signal $v_U$ 364, control signal $v_V$ 365, and the control signal $v_W$ 366 from the control signal $v_d$ 362 and control signal $v_q$ 363. For example, space vector modulation may also be used. In one example, the control signal $v_U$ 364 is representative of the value to regulate the u-component $i_U$ 355 (e.g. magnitude of phase current $I_{PHASEU}$), the control signal $v_V$ 365 is representative of the value to regulate the v-component $i_V$ 356 (e.g. magnitude of phase current $I_{PHASEV}$), and the control signal $v_W$ 366 is representative of the value to regulate the w-component $i_W$ 357 (e.g. magnitude of phase current $I_{PHASEW}$). It should be appreciated that, similar to reference frame translator 342, reference frame translator 352 performs a two-step transformation from the rotating two-axis reference frame of the rotor to the two-axis reference frame of the stator followed by a transformation to the three-axis reference frame of the motor windings. As such, the reference frame translator 352 generates control signal $v_\alpha$ 380, representative of the value to regulate the alpha-component $i_\alpha$ 358 to the desired value, and control signal $v_\beta$ 381, representative of the value to regulate the beta-component $i_\beta$ 359 to the desired value.

Control signal generator 354 receives control signal $v_U$ 364, $v_V$ 365, and $v_W$ 366 and in response, outputs the control signals CTRLU 120, CTRLV 126, and CTRLW 132 to their respective half-bridge modules. For example, the control signal generator 354 can output control signal CTRLU 120 in response to the control signal $v_U$ 364, outputs the control signal CTRLV 126 in response to control signal $v_V$ 365, and outputs the control signal CTRLW 132 in response to control signal $v_W$ 366. In operation, the control signal generator 354 may perform pulse width modulation (PWM) to output the control signals CTRLU 120, CTRLV 126, and CTRLW 132 in response to control signals $v_U$ 364, $v_V$ 365, and $v_W$ 366. In one example, control signals CTRLU 120, CTRLV 126, and CTRLW 132 are rectangular pulse width waveforms with varying lengths of high and low durations. A low value for control signals CTRLU 120, CTRLV 126, and CTRLW 132 could correspond with turning ON the respective high-side switch and turning OFF the respective low-side switch. A high value for control signals CTRLU 120, CTRLV 126, and CTRLW 132 could correspond with turning ON the respective low-side switch and turning OFF the respective high-side switch, or vice versa. The durations of the high and low sections of the control signals CTRLU 120, CTRLV 126, and CTRLW 132 may be computed in response to receiving the control signals $v_U$ 364, $v_V$ 365, and $v_W$ 366.

In one example, the system controller 306A, phase current reconstructor 340, and stator current angle estimator 348 can be implemented by dedicated logic circuitry or a microcontroller executing computer-executable instructions, such as a 48 MHz Cortex-M0 microcontroller. These microcontrollers generally have about 32-200 kB flash memory, about 8-16 kB of RAM, with a processing speed of about 48 MHz. For example, software may be utilized to program a microcontroller utilized for system controller 306A.

Figure 3B:
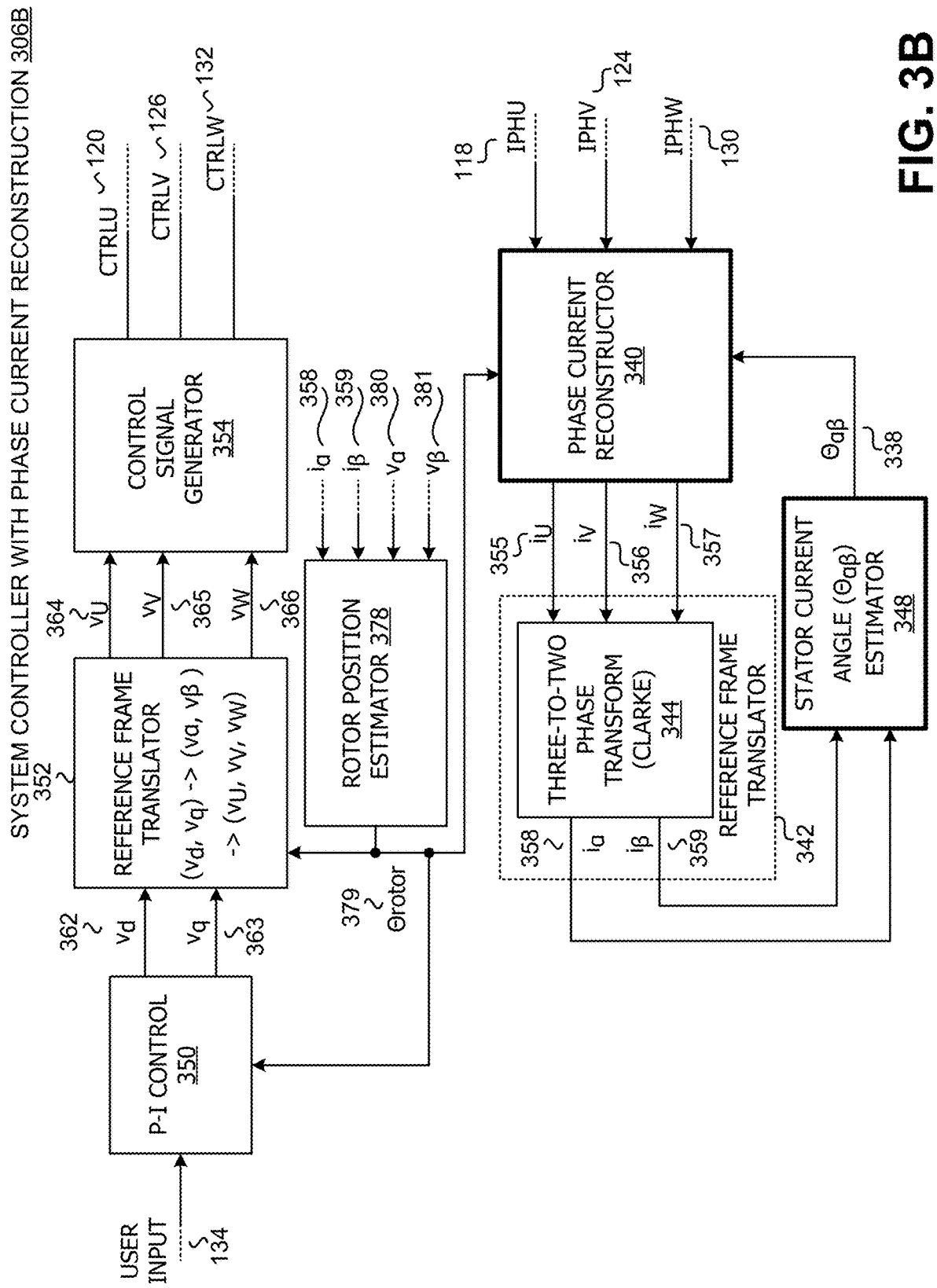
FIG. 3B is a functional block diagram of another system controller with phase current reconstruction of FIG. 1A, in accordance with teachings of the present disclosure.

FIG. 3B illustrates another example system controller 306A with a phase current reconstructor 340, in accordance with teachings of the present disclosure. System controller 306B is one example of system controller 106 and shares many similarities with system controller 306A, and similarly named and numbered elements couple and function as described above. At least one difference, however, is system controller 306B implements a pseudo field oriented control and there is no stationary-to-rotating transformation for the reference frame translator 342. However, it should be appreciated that the phase current reconstructor 340 and the stator current angle estimator 348 couple and function as described above with respect to FIG. 3A.

The reference frame translator 342 includes the three-phase to two-phase transformer 344, e.g. the Clarke transformer. As shown, the three-phase to two-phase transformer 344 receives the u-component $i_u$ 355, v-component $i_v$ 356, and w-component $i_w$ 357, representative of the reconstructed phase current magnitudes, and outputs the alpha-component $i_\alpha$ 358 and beta-component $i_\beta$ 359 related to the two-axis reference frame of the stator. The alpha-component $i_\alpha$ 358 and beta-component $i_\beta$ 359 are the magnitudes of the projection of the stator current vector $I_{\alpha\beta}$ on the $\alpha$-axis and $\beta$-axis, respectively. Stator current angle estimator 348 receives the alpha-component $i_\alpha$ 358 and beta-component $i_\beta$ 359 and outputs the estimated stator current angle $\Theta_{\alpha\beta}$ 338.

In the example system controller 306A shown in FIG. 3A, the P-I control block 350 receives the quadrature-component $i_q$ 361 and direct-component $i_d$ 360. However, for the system controller 306B shown in FIG. 3B, the P-I control block 350 receives the rotor angle $\Theta rotor$ 379. As described above, the rotor position estimator 378 determines the angular position of the rotor flux vector (e.g. rotor angle $\Theta rotor$ 379). In the example shown in FIG. 3B, the P-I control block 350 determines the control signal $v_q$ 363 in response to the user input 134, representative of the regulation of the quadrature-component of the motor. The control signal $v_d$ 362, representative of the regulation of the direct component of the motor, is substantially zero. P-I control block 350 also estimates and regulates the speed of the motor in response to the rotor angle $\Theta$rotor 379.

Figure 4:
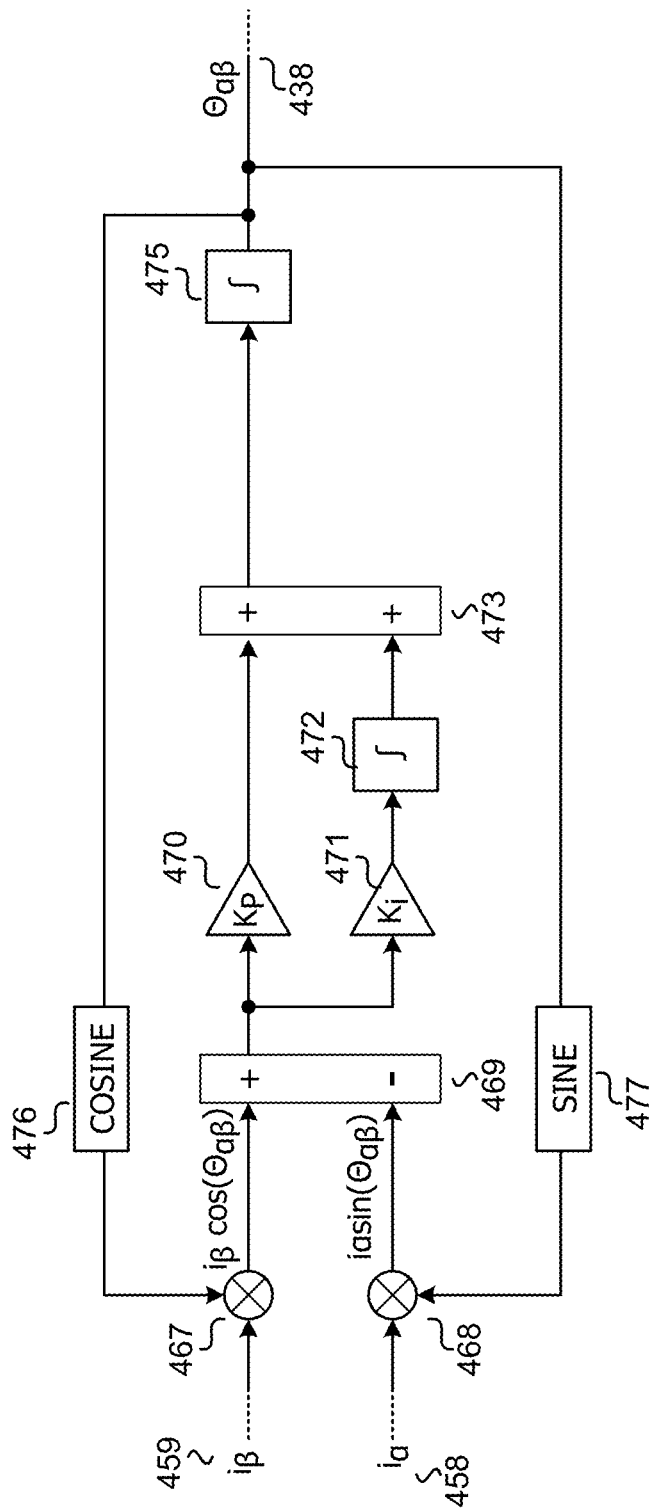
FIG. 4 is a functional block diagram of a stator current angle estimation of FIG. 3, in accordance with teachings of the present disclosure.

FIG. 4 illustrates a stator current angle estimator 448, which is one example of stator current angle estimator 348, and it should be appreciated that similarly named and numbered elements couple and function as described above. Stator current angle estimator 448 is shown as including a multiplier 467, multiplier 468, arithmetic operator 469, amplifier $K_P$ 470, amplifier $K_i$ 471, integrator 472, arithmetic operator 473, integrator 475, cosine 476, and sine 477.

The stator current angle estimator 448 receives the alpha-component $i_\alpha$ 458 and beta-component $i_\beta$ 459 of the stator current vector $I_{\alpha\beta}$ and outputs the estimated stator current angle $\Theta_{\alpha\beta}$ 438. Multiplier 467 is coupled to receive the beta-component $i_\beta$ 459 and the cosine of estimated stator current angle $\Theta_{\alpha\beta}$ 438. The output of multiplier 467 is substantially the product of the beta-component $i_\beta$ 459 and the cosine of estimated stator current angle $\Theta_{\alpha\beta}$ 438, or mathematically: $i_\beta \cos(\Theta_{\alpha\beta})$. Multiplier 468 is coupled to receive the alpha-component $i_\alpha$ 458 and the sine of estimated stator current angle $\Theta_{\alpha\beta}$ 438 and its output is substantially the product of the alpha-component $i_\alpha$ 458 and the sine of estimated stator current angle $\Theta_{\alpha\beta}$ 438, or mathematically: $i_\alpha \sin(\Theta_{\alpha\beta})$.

The outputs of multiplier 467 and multiplier 468 are received at arithmetic operator 469. As shown, arithmetic operator 469 performs subtraction and outputs the difference between the outputs of multiplier 467 and 468, or mathematically: $i_\beta \cos(\Theta_{\alpha\beta}) - i_\alpha \sin(\Theta_{\alpha\beta})$. Amplifiers 470 and 471 are coupled to receive the output of the arithmetic operator 469 and amplify the output of the arithmetic operator 469 by its gain, $K_P$ and $K_i$, respectively. An integrator 472 receives and integrates the output of amplifier $K_i$.

Arithmetic operator 473 is coupled to receive the output of amplifier 470 and integrator 472. As shown, arithmetic operator 473 is an adder and its output is the sum of the output of amplifier 470 and integrator 472. Integrator 475 is coupled to receive and integrate the output of arithmetic operator 473. The output of integrator 475 is the estimated stator current angle $\Theta_{\alpha\beta}$ 438. Cosine block 476 is coupled to receive the estimated stator current angle $\Theta_{\alpha\beta}$ 438 and output the cosine of stator current angle $\Theta_{\alpha\beta}$ 438 to multiplier 467. Similarly, sine block 477 is coupled to receive the estimated stator current angle $\Theta_{\alpha\beta}$ 438 and output the sine of stator current angle $\Theta_{\alpha\beta}$ 438 to multiplier 468.

Figure 5:
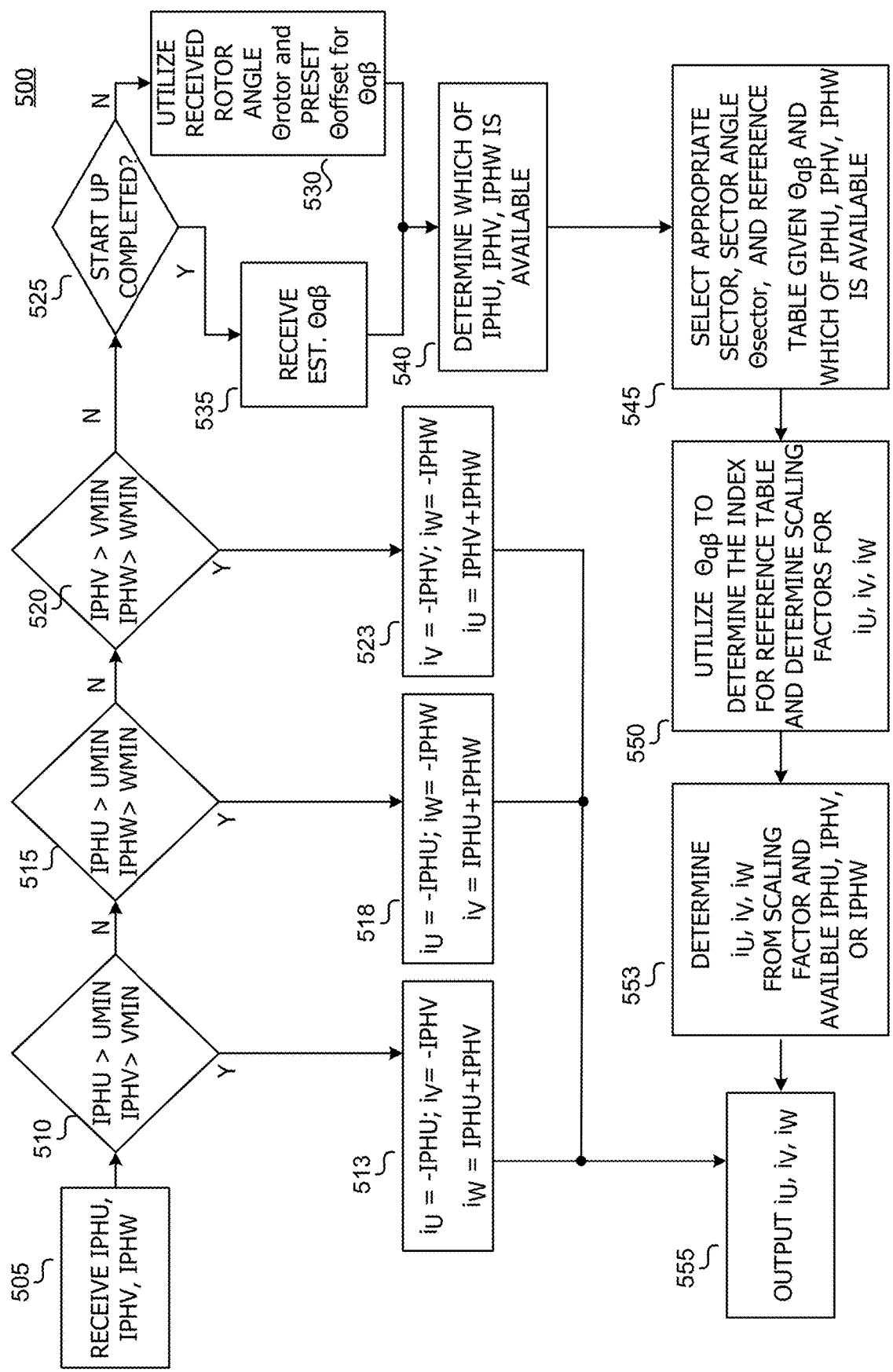
FIG. 5 is a flow diagram illustrating one example method of phase current reconstruction, in accordance with teachings of the present disclosure.

FIG. 5A illustrates a flow diagram 500 of one example method of phase current reconstruction by a system controller. The example process can be performed by a phase current reconstructor programmed in accordance with this specification, e.g., the phase current reconstructor shown in FIG. 3. It should be appreciated that the u-component $i_U$, v-component $i_V$, and w-component $i_W$ are representative of the magnitudes of the reconstructed phase currents for phase currents $I_{PHASEU}$, $I_{PHASEV}$, and $I_{PHASEW}$, respectively.

At block 505, the phase current sense signals IPHU, IPHV, and IPHW are received. The process proceeds to decision block 510. At decision block 510, phase current sense signal IPHU is compared to threshold UMIN and phase current sense signal IPHV is compared to threshold VMIN. If the phase current sense signal IPHU is greater than threshold UMIN and phase current sense signal IPHV is greater than VMIN, the process proceeds to block 513. At block 513, the reconstructed magnitudes of the phase currents, u-component $i_U$, v-component $i_V$, and w-component $i_W$ may be determined from phase current sense signals IPHU and IPHV. At block 513, the u-component $i_U$ is substantially the negative value of phase current sense signal IPHU ($i_U$=−IPHU), the v-component $i_V$ is substantially the negative value of phase current sense signal IPHV ($i_V$=−IPHV), and the w-component $i_W$ is substantially the sum of phase current sense signal IPHU and phase current sense signal IPHV ($i_W$=IPHU+IPHV). The process then continues to block 555 and the determined reconstructed phase current magnitudes, u-component $i_U$, v-component $i_V$, and w-component $i_W$ are outputted.

If either or both the phase current sense signal IPHU or the phase current sense signal IPHV is less than their respective thresholds UMIN or VMIN, the process proceeds to decision block 515. At decision block 515, phase current sense signal IPHU is compared to threshold UMIN and phase current sense signal IPHW is compared to threshold WMIN. If the phase current sense signal IPHU is greater than threshold UMIN and phase current sense signal IPHW is greater than WMIN, the process proceeds to block 518. At block 518, the reconstructed magnitudes of the phase currents, u-component $i_U$, v-component $i_V$, and w-component $i_W$ may be determined from phase current sense signals IPHU and IPHW. At block 518, the u-component $i_U$ is substantially the negative value of phase current sense signal IPHU ($i_U$=−IPHU), the w-component $i_W$ is substantially the negative value of phase current sense signal IPHW ($i_W$=−IPHW), and the v-component $i_V$ is substantially the sum of phase current sense signal IPHU and phase current sense signal IPHW ($i_V$=IPHU+IPHW). The process then continues to block 555 and the determined reconstructed phase current magnitudes, u-component $i_U$, v-component $i_V$, and w-component $i_W$ are outputted.

If either or both the phase current sense signal IPHU or the phase current sense signal IPHW is less than their respective thresholds UMIN or WMIN, the process proceeds to decision block 520. At decision block 520, phase current sense signal IPHV is compared to threshold VMIN and phase current sense signal IPHW is compared to threshold WMIN. If the phase current sense signal IPHV is greater than threshold VMIN and phase current sense signal IPHW is greater than WMIN, the process proceeds to block 523. At block 523, the reconstructed magnitudes of the phase currents, u-component $i_U$, v-component $i_V$, and w-component $i_W$ may be determined from phase current sense signals IPHV and IPHW. At block 518, the v-component $i_V$ is substantially the negative value of phase current sense signal IPHV ($i_V$=−IPHV), the w-component $i_W$ is substantially the negative value of phase current sense signal IPHW ($i_W$=−IPHW), and the u-component $i_U$ is substantially the sum of phase current sense signal IPHV and phase current sense signal IPHW ($i_U$=IPHV+IPHW). The process then continues to block 555 and the determined reconstructed phase current magnitudes, u-component $i_U$, v-component $i_V$, and w-component $i_W$ are outputted.

Thresholds UMIN, threshold VMIN, and threshold WMIN are offset thresholds and are thresholds utilized to check for the presence of the phase current sense signals IPHU, IPHV, and IPHW. In one embodiment, the phase current sense signals IPHU, IPHV, and IPHW have a minimum constant value even when no current is flowing through the low-side power switches of the half-bridge modules. As such, the thresholds UMIN, VMIN, and WMIN may be selected to disregard the minimum constant value. Further, the thresholds UMIN, VMIN, and WMIN may be utilized for noise rejection. In one example, the value of thresholds UMIN, VMIN, or WMIN are substantially equal.

If either or both the phase current sense signal IPHV or the phase current sense signal IPHW is less than their respective thresholds VMIN or WMIN, the process proceeds to decision block 525. If the process proceeds to decision block 525, one of phase current sense signals IPHU, IPHV, or IPHW is greater than their respective thresholds UMIN, VMIN, or WMIN while the other two-phase current sense signals are less than their respective thresholds UMIN, VMIN, or WMIN. When only one of the phase current sense signals is greater than their respective threshold, the phase current reconstructor utilizes reference tables and an estimated stator current angle $\Theta_{\alpha\beta}$ to reconstruct the phase current and determine the reconstructed phase current magnitudes, u-component $i_U$, v-component $i_V$, and w-component $i_W$.

At decision block 525, it is determined if start-up operation is complete for the motor drive system. If start-up operation is not completed, the process proceeds to block 530 and the phase current reconstructor receives the rotor angle Θrotor and a preset offset angle Θoffset to determine the stator current angle $\Theta_{\alpha\beta}$. In one example, the stator current angle $\Theta_{\alpha\beta}$ is substantially the sum of the rotor angle Θrotor and the preset offset angle Θoffset, or mathematically: $\Theta_{\alpha\beta}=\Theta_{rotor}+\Theta_{offset}$. The preset offset angle Θoffset may be substantially ninety degrees (90°) and is representative of the angular distance which the rotor flux vector is behind the stator current vector. The stator current angle $\Theta_{\alpha\beta}$ determined from the rotor angle Θrotor and the preset offset angle Θoffset is utilized by the phase current reconstructor to reconstruct the phase current magnitudes, u-component $i_U$, v-component $i_V$, and w-component $i_W$. If the start-up operation is completed, the process proceeds to block 535 and the phase current reconstructor receives the estimated stator current angle $\Theta_{\alpha\beta}$ from the stator current angle estimator. The estimated stator current angle $\Theta_{\alpha\beta}$ from the is utilized by the phase current reconstructor to reconstruct the phase current magnitudes, u-component $i_U$, v-component $i_V$, and w-component $i_W$.

From block 530 or 535, the process proceeds to block 540. At block 540, the phase current reconstructor determines which of the phase current sense signals IPHU, IPHV, or IPHW is available. In other words, the phase current reconstructor determines which of the phase current sense signals IPHU, IPHV, and IPHW is greater than its respective threshold UMIN, VMIN, and WMIN. For whichever of the phase current sense signals IPHU, IPHV, or IPHW is determined to be present, its corresponding reconstructed phase current magnitude $i_U$, $i_V$, or $i_W$ is substantially the negative value of the available phase current signal. For example, if phase current sense signal IPHU is present, its corresponding u-component $i_U$ (e.g. the reconstructed phase current magnitude) is substantially the negative of phase current sense signal IPHU, or mathematically: $i_U=-\text{IPHU}$. If phase current sense signal IPHV is present, its corresponding v-component $i_V$ (e.g. the reconstructed phase current magnitude) is substantially the negative of phase current sense signal IPHV, or mathematically: $i_V=-\text{IPHV}$. If phase current sense signal IPHW is present, its corresponding w-component $i_W$ (e.g. the reconstructed phase current magnitude) is substantially the negative of phase current sense signal IPHW, or mathematically: $i_W=-\text{IPHW}$. Once the available phase current sense signal is determined and the corresponding reconstructed phase current magnitude is determined, the process proceeds to block 545.

At block 545, the appropriate sector is selected. As mentioned above with respect to FIGS. 2A and 2B, the three hundred sixty degrees (360°) period can be sectioned into six sectors of substantially sixty-degree (60°) increments. The sector is selected in response to the value of the determined or estimated stator current angle $\Theta_{\alpha\beta}$ provided from block 530 or 535. For example, a stator current angle $\Theta_{\alpha\beta}$ equal to eighty-five degrees (85°) would correspond to sector 5.

In one example, sector 0 corresponds with stator current angles $\Theta_{\alpha\beta}$ from ninety degrees (90°) to one hundred forty-nine degrees (149°). Sector 1 corresponds with stator current angles $\Theta_{\alpha\beta}$ from one hundred fifty (150°) degrees to two hundred nine (209°) degrees. Sector 2 corresponds with stator current angles $\Theta_{\alpha\beta}$ from two hundred ten (210°) degrees to two hundred sixty-nine degrees (269°). Sector 3 corresponds with stator current angles $\Theta_{\alpha\beta}$ from two hundred seventy degrees (270°) to three hundred twenty-nine degrees (329°). Sector 4 corresponds with stator current angles $\Theta_{\alpha\beta}$ from three hundred thirty (330°) to three hundred sixty degrees (359°) and from zero degrees (0°) to twenty-nine degrees (29°). Sector 5 corresponds with stator current angles $\Theta_{\alpha\beta}$ from thirty degrees (30°) to eighty-nine degrees (90°).

Once the sector has been determined, the sector angle Θsector can also be determined. The sector angle Θsector corresponds with the first occurring degree in a sector from the counterclockwise direction. As will be further discussed, the stator current angle $\Theta_{\alpha\beta}$, along with the sector angle Θsector are used to determine the index Θindex for the appropriate reference table. The index Θindex is used to determine which stored value representative of the reconstruction scaling factor in the reference table is used for the appropriate u/v/w-component. The sector and corresponding sector angle Θsector are shown in Table 1 below:

TABLE 1

Corresponding stator current angles $\Theta_{\alpha\beta}$, sector, and sector angle Θsector

| Stator Current Angle $\Theta_{\alpha\beta}$ | Sector | Sector Angle Θsector |
| --- | --- | --- |
| 90°-149° | Sector 0 | 90° |
| 150°-209° | Sector 1 | 150° |
| 210°-269° | Sector 2 | 210° |
| 270°-329° | Sector 3 | 270° |
| 330°-359°; 0°-29° | Sector 4 | 330° |
| 30°-89° | Sector 5 | 30° |

Once the sector is determined, the appropriate reference tables may be selected in response to the sector, the stator current angle $\Theta_{\alpha\beta}$, and which one of the phase current sense signal IPHU, IPHV, or IPHW is available. FIGS. 6A and 7A illustrate examples for determining the appropriate reference table for phase current reconstruction. It should be appreciated that since only one of phase current sense signal IPHU, IPHV, or IPHW is available, two reference tables are selected for the other two motor windings which are not available.

The process then proceeds to block 550. The stator current angles $\Theta_{\alpha\beta}$, along with the sector angle Θsector, are utilized to determine the index Θindex for the appropriate reference tables to determine the stored value representative of the reconstruction scaling factors for the reconstructed phase current magnitudes, u-component $i_U$, v-component $i_V$, and/or the w-component $i_W$. As will be discussed, the index Θindex is the difference between the stator current angles $\Theta_{\alpha\beta}$ and the sector angle Θsector, or mathematically: $\Theta_{index}=\Theta_{\alpha\beta}-\Theta_{sector}$.

For example, if phase current sense signal IPHU is available, reference tables are selected to determine the scaling factors which are utilized to reconstruct the phase current magnitudes, v-component $i_V$ and w-component $i_W$, corresponding with phase currents, $I_{PHASEV}$ and $I_{PHASEW}$, respectively. Both reference tables are selected in response to the sector determined from the stator current angles $\Theta_{\alpha\beta}$. Further, if the stator current angle $\Theta_{\alpha\beta}$ is eighty-five degrees (85°), the sector would be sector 5, the sector angle $\Theta_{sector}$ is thirty degrees (30°) and the index $\Theta_{index}$ is fifty-five degrees (55°). As such, an index $\Theta_{index}$ of fifty-five degrees (55°) is utilized to determine the location for the scaling factors in their corresponding reference tables to be used to reconstruct the phase current magnitudes, v-component $i_V$ and w-component $i_W$.

Once the scaling factors are selected, the process proceeds to block 553 and the reconstructed phase current magnitudes, u-component $i_U$, v-component $i_V$ and w-component $i_w$ are determined from the scaling factors and which of the phase current sense signals IPHU, IPHV, or IPHW is available. It should be appreciated that for the reconstructed phase current magnitudes in which the corresponding phase current sense signal is not available, the reconstructed phase current magnitude is substantially the product of the selected scaling factor from the appropriate reference table and the available phase current sense signal. For example, if the phase current sense signal IPHU is available and phase current sense signals IPHV and IPHW are not available, the reconstructed phase current magnitudes, v-component $i_V$ and w-component $i_W$ is substantially the product of the appropriate scaling factor and the phase current sense signal IPHU. For example, the reconstructed phase current magnitude, v-component $i_V$, is substantially the product of the selected scaling factor from step 550 and phase current sense signal IPHU. Similarly, the reconstructed phase current magnitude, w-component $i_w$ is substantially the product of the selected scaling factor from step 550 and phase current sense signal IPHU. The reconstructed phase current magnitude, u-component $i_U$, corresponds with the negative of the phase current sense signal IPHU, or mathematically: $i_U$=-IPHU.

Once the reconstructed phase current magnitudes, u-component $i_U$, v-component $i_V$, and/or the w-component $i_W$ are determined, the process proceeds to block 555 and the phase current reconstructor outputs the u-component $i_U$, v-component $i_V$, and/or the w-component $i_W$. It should be appreciated that the u-component $i_u$ is representative of the magnitude of phase current $I_{PHASEU}$, v-component $i_V$ is representative of the magnitude of phase current $I_{PHASEV}$, and w-component $i_w$ is representative of the magnitude of phase current $I_{PHASEW}$.

FIG. 6A illustrates table 600 which shows one example process for selecting the reconstruction reference table in response to the stator current angle $\Theta_{\alpha\beta}$ and which one of the phase current sense signal IPHU, IPHV, or IPHW is available. As mentioned above, the sector and sector angle $\Theta_{sector}$ are determined from the stator current angle $\Theta_{\alpha\beta}$. Once the sector is determined, the appropriate reference table is selected in response to which of the phase current sense signals IPHU, IPHV, IPHW are available. In other words, the phase current reconstructor determines which of the phase current sense signals IPHU, IPHV, and IPHW is greater than its respective threshold UMIN, VMIN, and WMIN.

For the example shown, sector 0 corresponds with stator current angles $\Theta_{\alpha\beta}$ from ninety degrees (90°) to one hundred forty-nine degrees (149°). Sector 1 corresponds with stator current angles $\Theta_{\alpha\beta}$ from one hundred fifty (150°) degrees to two hundred nine (209°) degrees. Sector 2 corresponds with stator current angles $\Theta_{\alpha\beta}$ from two hundred ten (210°) degrees to two hundred sixty-nine degrees (269°). Sector 3 corresponds with stator current angles $\Theta_{\alpha\beta}$ from two hundred seventy degrees (270°) to three hundred twenty-nine degrees (329°). Sector 4 corresponds with stator current angles $\Theta_{\alpha\beta}$ from three hundred thirty (330°) to three hundred sixty degrees (359°) and from zero degrees (0°) to twenty-nine degrees (29°). Sector 5 corresponds with stator current angles $\Theta_{\alpha\beta}$ from thirty degrees (30°) to eighty-nine degrees (90°).

Referring to the first row corresponding to sector 0 for stator current angles $\Theta_{\alpha\beta}$ from ninety to one hundred forty-nine degrees (90°-149°). If phase current sense signal IPHU is available for sector 0, reference table A is utilized to determine the scaling factor for the w-component $i_W$ to reconstruct the phase current $I_{PHASEW}$. As mentioned above, the w-component $i_w$ is representative of the magnitude of phase current $I_{PHASEW}$ 128, and is substantially the product of the scaling factor selected from reference table A and the phase current sense signal IPHU. Further, reference table B is utilized to determine the scaling factor for the v-component $i_v$ to reconstruct the phase current $I_{PHASEV}$, the v-component $i_v$ is representative of the magnitude of phase current $I_{PHASEV}$ and is substantially the product of the scaling factor selected from reference table B and the phase current sense signal IPHU.

If phase current sense signal IPHW is available for sector 0, reference table A' is utilized to determine the scaling factor of the u-component $i_u$ to reconstruct the phase current $I_{PHASEU}$, the u-component $i_U$ is representative of the magnitude of phase current $I_{PHASEU}$ and is substantially the product of the scaling factor selected from reference table A' and the phase current sense signal IPHW. Further, reference table B' is utilized to determine the value for the v-component $i_v$ to reconstruct the phase current $I_{PHASEV}$, the v-component $i_v$ is representative of the magnitude of phase current $I_{PHASEV}$ and is substantially the product of the scaling factor selected from reference table B' and the phase current sense signal IPHW.

As shown in FIG. 6A, in one embodiment, the phase current reconstructor utilizes three reference tables, reference tables A, B, and C. These reference tables may also be referred to as the first reference table (A), second reference table (B) and third reference table (C). The table 600 also illustrates reference tables A', B' and C'. These reference tables may also be referred to as the reverse first reference table (A'), reverse second reference table (B') and reverse third reference table (C'). Reference tables A', B', and C' substantially correspond with reference tables A, B, and C, however, are indexed in reverse from reference tables A, B, and C. As mentioned above, the index $\Theta_{index}$ for references tables is substantially the difference between the stator current angles $\Theta_{\alpha\beta}$ and the sector angle $\Theta_{sector}$, or mathematically: $\Theta_{index}=\Theta_{\alpha\beta}-\Theta_{sector}$. As such, the index $\Theta_{index}$ has sixty values and varies from 0 degrees to fifty-nine degrees (0°-59°).

For example, a prestored value representative of scaling factors to reconstruct the phase current magnitudes is stored in reference table A at a location corresponding to index $\Theta_{index}$ at zero degrees (0°). The same prestored value is stored in reverse in reference table A'. For example, the prestored value is stored at a location corresponding to index $\Theta_{index}$ at fifty-nine degrees (59°) in reference table A'. A prestored value is stored in reference table A at a location corresponding to index $\Theta_{index}$ at one degree (1°). The same prestored value is stored at a location corresponding to index $\Theta_{index}$ at fifty-eight degrees (58°) in reference table A', and so on and so forth. This indexing is similar for reference table B with reference table B', and reference table C and reference table C'.

If the phase current sense signal IPHV is available for sector 0, reference table C is utilized to determine the value of the u-component $i_u$ to reconstruct the phase current $I_{PHASEU}$, the u-component $i_U$ is representative of the magnitude of phase current $I_{PHASEU}$ and is substantially the product of the scaling factor selected from reference table C and the phase current sense signal IPHV. Further, reference table C' is utilized to determine the value for the w-component $i_w$ to reconstruct the phase current $I_{PHASEW}$, the w-component $i_w$ is representative of the magnitude of phase current $I_{PHASEW}$ and is substantially the product of the scaling factor selected from reference table C' and the phase current sense signal IPHV. However, these sections of the 600 are grayed out, as generally in sector 0, it is phase current sense signals IPHU and IPHW which are available.

Referring to row 2 of table 600 corresponding to sector 1 for stator current angles $\Theta_{\alpha\beta}$ from one hundred fifty to two hundred nine degrees (150°-209°). If phase current sense signal IPHU is available for sector 1, reference table C is utilized to determine the scaling factor for the w-component $i_W$ and the w-component $i_W$ is substantially the product of the scaling factor selected from reference table C and the phase current sense signal IPHU. Further, reference table C' is utilized to determine the scaling factor for the v-component $i_v$ and the v-component $i_v$ is substantially the product of the scaling factor selected from reference table C' and the phase current sense signal IPHU.

If phase current sense signal IPHW is available for sector 1, reference table B is utilized to determine the scaling factor of the u-component $i_u$ to reconstruct the phase current $I_{PHASEU}$. Further, reference table A is utilized to determine the scaling factor for the v-component to reconstruct the phase current $I_{PHASEV}$. If phase current sense signal IPHV is available for sector 1, reference table B' is utilized to determine the scaling factor of the u-component $i_u$ and reference table A' is utilized to determine the scaling factor for the w-component $i_w$. However, these sections of the 600 are grayed out, as generally in sector 1, it is phase current sense signals IPHU which is available.

Referring to row 3 of table 600 corresponding to sector 2 for stator current angles $\Theta_{\alpha\beta}$ from two hundred ten to two hundred sixty-nine degrees (210°-269°). If phase current sense signal IPHU is available for sector 2, reference table B' is utilized to determine the scaling factor for the w-component $i_W$ and reference table A' is utilized to determine the scaling factor for the v-component $i_v$. The w-component $i_W$ is substantially the product of the scaling factor selected from reference table B' and the phase current sense signal IPHU and the v-component $i_v$ is substantially the product of the scaling factor selected from reference table A' and the phase current sense signal IPHU. If phase current sense signal IPHV is available for sector 2, reference table A is utilized to determine the scaling factor of the u-component $i_u$ and reference table B is utilized to determine the scaling factor for the w-component $i_w$. The u-component $i_u$ is substantially the product of the scaling factor selected from reference table A and the phase current sense signal IPHV and the w-component $i_w$ is substantially the product of the scaling factor selected from reference table B and the phase current sense signal IPHV.

If phase current sense signal IPHW is available for sector 2, reference table C' is utilized to determine the scaling factor of the u-component $i_u$ and reference table C is utilized to determine the scaling factor for the v-component $i_v$. However, these sections of the 600 are grayed out, as generally in sector 2, it is phase current sense signals IPHU and IPHV which are available.

Referring to row 4 of table 600 corresponding to sector 3 for stator current angles $\Theta_{\alpha\beta}$ from two hundred seventy to three hundred twenty-nine (270°-329°). If phase current sense signal IPHV is available for sector 3, reference table C is utilized to determine the value of the u-component $i_u$ and reference table C' is utilized to determine the value for the w-component $i_w$. The u-component $i_u$ is substantially the product of the scaling factor selected from reference table C and the phase current sense signal IPHV and the w-component $i_w$ is substantially the product of the scaling factor selected from reference table C' and the phase current sense signal IPHV.

If phase current sense signal IPHU is available for sector 3, reference table A is utilized to determine the scaling factor for the w-component $i_W$ and reference table B is utilized to determine the scaling factor for the v-component $i_v$. If phase current sense signal IPHW is available for sector 3, reference table A' is utilized to determine the scaling factor of the u-component $i_u$ and reference table B' is utilized to determine the scaling factor for the v-component $i_v$. However, these sections of the 600 are grayed out, as generally in sector 3, it is phase current sense signals IPHV which is available.

Referring to row 5 of table 600 corresponding to sector 4 for stator current angles $\Theta_{\alpha\beta}$ from three hundred thirty to three hundred fifty-nine and zero to twenty nine degrees (330°-359°; 0°-29°). If phase current sense signal IPHW is available for sector 4, reference table B is utilized to determine the scaling factor of the u-component $i_u$ and reference table A is utilized to determine the scaling factor for the v-component $i_v$. The u-component $i_u$ is substantially the product of the scaling factor selected from reference table B and the phase current sense signal IPHW and the v-component $i_v$ is substantially the product of the scaling factor selected from reference table A and the phase current sense signal IPHW. If phase current sense signal IPHV is available for sector 4, reference table B' is utilized to determine the scaling factor of the u-component $i_u$ and reference table A' is utilized to determine the scaling factor for the w-component $i_w$. The u-component $i_u$ is substantially the product of the scaling factor selected from reference table B' and the phase current sense signal IPHV and the w-component $i_w$ is substantially the product of the scaling factor selected from reference table A' and the phase current sense signal IPHV.

If phase current sense signal IPHU is available for sector 4, reference table C is utilized to determine the scaling factor for the w-component $i_W$ and reference table C' is utilized to determine the scaling factor for the v-component $i_v$. However, these sections of the 600 are grayed out, as generally in sector 4, it is phase current sense signals IPHW and IPHV which are available.

Referring to row 6 of table 600 corresponding to sector 5 for stator current angles $\Theta_{\alpha\beta}$ from thirty to eighty-nine degrees (30°-89°). If phase current sense signal IPHW is available for sector 5, reference table C' is utilized to determine the scaling factor of the u-component $i_u$ and reference table C is utilized to determine the scaling factor for the v-component $i_v$. The u-component $i_u$ is substantially the product of the scaling factor selected from reference table C' and the phase current sense signal IPHW and the v-component $i_v$ is substantially the product of the scaling factor selected from reference table C and the phase current sense signal IPHW.

If phase current sense signal IPHU is available for sector 5, reference table B' is utilized to determine the scaling factor for the w-component $i_w$ and reference table A' is utilized to determine the scaling factor for the v-component $i_v$. If phase current sense signal IPHV is available for sector 5, reference table A is utilized to determine the scaling factor of the u-component $i_u$ and reference table B is utilized to determine the scaling factor for the w-component $i_w$. However, these sections of the 600 are grayed out, as generally in sector 5, it is phase current sense signals IPHW which is available.

As such, in response to the stator current angle $\Theta_{\alpha\beta}$, the sector and the sector angle $\Theta$sector may be determined and the appropriate reference table and scaling factor is selected in response to the available phase current sense signals IPHU, IPHV, IPHW to reconstruct the other phase currents magnitudes which are unavailable.

FIG. 6B illustrates another table 601 showing the contents of the reference tables A, B and C for reconstructing the phase currents. As mentioned above, the reference tables utilize the index $\Theta$index to indicate the location of the prestored value in the reference table. In one example, the prestored values are representative of the scaling factors utilized to reconstruct the phase current magnitudes. Further, the prestored values are also computed based on the index $\Theta$index. The index $\Theta$index is substantially the difference between the stator current angles $\Theta_{\alpha\beta}$ and the sector angle $\Theta$sector, or mathematically: $\Theta_{index}=\Theta_{\alpha\beta}-\Theta_{sector}$. As such, the index $\Theta$index has sixty values and varies from 0 degrees to fifty-nine degrees (0°-59°).

Each of reference tables A, B, and C store values corresponding to different values of the index $\Theta$index. In one example, each of reference tables A, B, and C store values in one-degree increments for sixty degrees of the index $\Theta$index. For reference table A, each stored value representative of the scaling factors is substantially equal to the sine of the sum of the index $\Theta$index and one hundred twenty degrees divided by the sine of the index $\Theta$index, or mathematically:

$$\frac{\sin(\Theta_{index}+120)}{\sin(\Theta_{index})}.$$

For reference table B, each stored value representative of the scaling factors is substantially equal to the sine of the difference of the index $\Theta$index and one hundred twenty degrees divided by the sine of the index $\Theta$index, or mathematically:

$$\frac{\sin(\Theta_{index}-120)}{\sin(\Theta_{index})}.$$

For reference table C, each stored value representative of the scaling factors is substantially equal to the sine of the index $\Theta$index divided by the sine of the difference of the index $\Theta$index and one hundred twenty degrees, or mathematically:

$$\frac{\sin(\Theta_{index})}{\sin(\Theta_{index}-120)}.$$

Reference tables A', B', and C' substantially correspond with reference tables A, B, and C, however, are indexed in reverse from reference tables A, B, and C. For example, a prestored value stored in reference table A at a location corresponding to index $\Theta$index at zero degrees (0°). The same prestored value is stored in reverse in reference table A'. For example, the prestored value is stored at a location corresponding to index $\Theta$index at fifty-nine degrees (59°) in reference table A'. A prestored value is stored in reference table A at a location corresponding to index $\Theta$index at one degree (1°). The same prestored value is stored at a location corresponding to index $\Theta$index at fifty-eight degrees (58°) in reference table A', and so on and so forth. This indexing is similar for reference table B with reference table B', and reference table C and reference table C'.

As mentioned previously, embodiments of the present disclosure utilize phase current sense signals IPHU, IPHV, IPHW which facilitates the overall reduction of component count, cost, power loss as compared to traditional phase current feedback. In addition, the utilization of reference tables allows for increased processing speeds for phase current reconstruction.

FIG. 7A illustrates table 700 which shows another example process for selecting the reconstruction reference table in response to the stator current angle $\Theta_{\alpha\beta}$ and which one of the phase current sense signal IPHU, IPHV, or IPHW is available. In embodiments of the present disclosure, for each sector there are two phase currents which cross and are substantially opposites of each other while the other phase current has the opposite polarity. For example, in sector 0, phase currents $I_{PHASEU}$ 116 and $I_{PHASEW}$ 128 are crossing and phase current $I_{PHASEV}$ 122 is of the opposite polarity of phase currents $I_{PHASEU}$ 116 and $I_{PHASEW}$ 128. In sector 1, phase currents $I_{PHASEV}$ 122 and $I_{PHASEW}$ 128 are crossing while phase current $I_{PHASEU}$ 116 is of the opposite polarity of phase currents $I_{PHASEV}$ 122 and $I_{PHASEW}$ 128. So on and so forth. Further, in an "even" sector (sectors 0, 2, and 4), the phase currents which are crossing are negative in polarity and in the "odd" sectors (sectors 1, 3, and 5), the phase currents which are crossing are positive in polarity. As such, another pattern was recognized and the three reference tables utilized with respect to FIGS. 6A and 6B could be simplified to two reference tables, referred to as reference table E and reference table D.

As mentioned above, the sector and sector angle $\Theta$sector are determined from the stator current angle $\Theta_{\alpha\beta}$. Once the sector is determined, the appropriate reference table is selected in response to which of the phase current sense signals IPHU, IPHV, IPHW are available. In other words, the phase current reconstructor determines which of the phase current sense signals IPHU, IPHV, and IPHW is greater than its respective threshold UMIN, VMIN, and WMIN.

For the example shown, sector 0 corresponds with stator current angles $\Theta_{\alpha\beta}$ from ninety degrees (90°) to one hundred forty-nine degrees (149°). Sector 1 corresponds with stator current angles $\Theta_{\alpha\beta}$ from one hundred fifty (150°) degrees to two hundred nine (209°) degrees. Sector 2 corresponds with stator current angles $\Theta_{\alpha\beta}$ from two hundred ten (210°) degrees to two hundred sixty-nine degrees (269°). Sector 3 corresponds with stator current angles $\Theta_{\alpha\beta}$ from two hundred seventy degrees (270°) to three hundred twenty-nine degrees (329°). Sector 4 corresponds with stator current angles $\Theta_{\alpha\beta}$ from three hundred thirty (330°) to three hundred sixty degrees (359°) and from zero degrees (0°) to twenty-nine degrees (29°). Sector 5 corresponds with stator current angles $\Theta_{\alpha\beta}$ from thirty degrees (30°) to eighty-nine degrees (90°).

Referring to the first row corresponding to sector 0 for stator current angles $\Theta_{\alpha\beta}$ from ninety to one hundred forty-nine degrees (90°-149°). Sector 0 is an even number, and as such reference table E and E' are utilized to reconstruct the phase currents. If phase current sense signal IPHU is available for sector 0, reference table E' is utilized to determine the scaling factor for the v-component $i_V$ and the v-component $i_v$ is substantially the product of the scaling factor from reference table E' and phase current sense signal IPHU. If phase current sense signal IPHW is available for sector 0, reference table E is utilized to determine the scaling factor for the v-component $i_v$ and the v-component $i_v$ is substantially the product of the scaling factor from reference table E and phase current sense signal IPHW.

FIG. 7A illustrates the selection of reference table E, E' and reference table D, D'. Reference tables E and D may also be referred to as first reference table (E) and second reference table (D). Reference tables E' and D' substantially correspond with reference tables E and D, respectively, however, are indexed in reverse from reference tables E and D. Reference tables E' and D' may also be referred to as the reverse first reference table (E') and reverse second reference table (D'). As mentioned above, the index Θindex for references tables is substantially the difference between the stator current angles $\Theta_{\alpha\beta}$ and the sector angle Θsector, or mathematically: $\Theta_{index} = \Theta_{\alpha\beta} - \Theta_{sector}$. As such, in one example, the index Θindex has sixty values and varies from 0 degrees to fifty-nine degrees (0°-59°).

For example, prestored values representative of scaling factors are stored in reference table E at a location corresponding to index Θindex at zero degrees (0°). The same prestored value is stored in reverse in reference table E'. For example, the prestored value is stored at a location corresponding to index Θindex at fifty-nine degrees (59°) in reference table E'. A prestored value is stored in reference table E at a location corresponding to index Θindex at one degree (1°). The same prestored value is stored at a location corresponding to index Θindex at fifty-eight degrees (58°) in reference table E', and so on and so forth. This indexing is similar for reference table D and D'.

Referring to row 2 of table 700 corresponding to sector 1 for stator current angles $\Theta_{\alpha\beta}$ from one hundred fifty to two hundred nine degrees (150°-209°). Sector 1 is an odd number, and as such reference table D and D' are utilized to reconstruct the phase currents. If phase current sense signal IPHU is available for sector 1, reference table D is utilized to determine the scaling factor for the w-component $i_W$ and reference table D' is utilized to determine the scaling factor for the v-component $i_v$. The w-component $i_W$ is substantially the product of the scaling factor from reference table D and the phase current sense signal IPHU. The v-component $i_v$ is substantially the product of the scaling factor from reference table D' and the phase current sense signal IPHU.

Referring to row 3 of table 700 corresponding to sector 2 for stator current angles $\Theta_{\alpha\beta}$ from two hundred ten to two hundred sixty-nine degrees (210°-269°). Sector 2 is an even number, and as such reference tables E and E' are utilized. If phase current sense signal IPHU is available for sector 2, reference table E is utilized to determine the scaling factor for the w-component $i_W$. The w-component $i_W$ is substantially the product of the scaling factor from reference table E and the phase current sense signal IPHU. If phase current sense signal IPHV is available for sector 2, reference table E' is utilized to determine the scaling factor for the w-component $i_w$. The w-component $i_w$ is substantially the product of the scaling factor from reference table E' and the phase current sense signal IPHV.

Referring to row 4 of table 700 corresponding to sector 3 for stator current angles $\Theta_{\alpha\beta}$ from two hundred seventy to three hundred twenty-nine (270°-329°). Sector 3 is an odd number, and as such reference table D and D' are utilized to reconstruct the phase currents. If phase current sense signal IPHV is available for sector 3, reference table D is utilized to determine the scaling factor of the u-component $i_u$ and reference table D' is utilized to determine the scaling factor for the w-component $i_w$. The u-component $i_W$ is substantially the product of the scaling factor from reference table D and the phase current sense signal IPHV. The v-component $i_v$ is substantially the product of the scaling factor from reference table D' and the phase current sense signal IPHV.

Referring to row 5 of table 700 corresponding to sector 4 for stator current angles $\Theta_{\alpha\beta}$ from three hundred thirty to three hundred fifty-nine and zero to twenty-nine degrees (330°-359°; 0°-29°). Sector 4 is an even number, and as such reference tables E and E' are utilized. If phase current sense signal IPHW is available for sector 4, reference table E' is utilized to determine the scaling factor of the u-component $i_u$. The u-component $i_u$ is substantially the product of the scaling factor from reference table E' and the phase current sense signal IPHW. If phase current sense signal IPHV is available for sector 4, reference table E is utilized to determine the scaling factor of the u-component $i_u$. The u-component $i_u$ is substantially the product of the scaling factor from reference table E and the phase current sense signal IPHV.

Referring to row 6 of table 700 corresponding to sector 5 for stator current angles $\Theta_{\alpha\beta}$ from thirty to eighty-nine degrees (30°-89°). Sector 5 is an odd number, and as such reference table D and D' are utilized to reconstruct the phase currents. If phase current sense signal IPHW is available for sector 5, reference table D' is utilized to determine the scaling factor of the u-component $i_u$ and reference table D is utilized to determine the scaling factor for the v-component $i_v$. The w-component $i_W$ is substantially the product of the scaling factor from reference table D' and the phase current sense signal IPHW. The v-component $i_v$ is substantially the product of the scaling factor from reference table D and the phase current sense signal IPHW.

As such, in response to the stator current angle $\Theta_{\alpha\beta}$, the sector and sector angle Θsector may be determined and the appropriate reference table and scaling factor is selected in response to which of the phase current sense signals IPHU, IPHV, IPHW are available to reconstruct the other phase currents which are unavailable.

FIG. 7B illustrates another table 701 showing the contents of the reference tables D and E for reconstructing the phase currents. As mentioned above, the reference tables utilize the index Θindex to indicate the location of the prestored value in the reference table. Further, the prestored values representative of scaling factors utilized to reconstruct the phase current magnitudes are also computed based on the index Θindex. The index Θindex is substantially the difference between the stator current angles $\Theta_{\alpha\beta}$ and the sector angle Θsector, or mathematically: $\Theta_{index} = \Theta_{\alpha\beta} - \Theta_{sector}$. As such, in one example, the index Θindex has sixty values and varies from 0 degrees to fifty-nine degrees (0°-59°).

Each of the reference tables E and D have sixty values stored, each stored value corresponding with one of the sixty values of the index Θindex. For table E, each stored value representative of the scaling factors is substantially equal to the sine of the sum of the index Θindex and sixty degrees divided by the sine of the difference between sixty degrees and index Θindex, or mathematically:

$$\frac{\sin(\Theta_{index}+60)}{\sin(60-\Theta_{index})}.$$

For reference table D, each stored value representative of the scaling factors is substantially equal to the sine of the index Θindex divided by the sine of the sum of the index Θindex and sixty degrees, or mathematically:

$$\frac{\sin(\Theta_{index})}{\sin(\Theta_{index}+60)}.$$

As mentioned previously, embodiments of the present disclosure utilize phase current sense signals IPHU, IPHV, IPHW which facilitates the overall reduction of component count, cost, power loss as compared to traditional phase current feedback. In addition, the utilization of reference tables allows for increased processing speeds for phase current reconstruction.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A system controller for a motor drive system with a plurality of devices that are operable to drive a motor, the system controller comprising:
    a phase current reconstructor configured to perform operations comprising:
        receiving a plurality of phase current sense signals including a respective phase current sense signal from each device of the plurality of devices,
        selecting, based on a stator current angle, a reference table from among a plurality of reference tables that store reconstruction scaling factors,
        obtaining, from the selected reference table, a respective reconstruction scaling factor for one of the phase currents,
        generating, based on the respective reconstruction scaling factor for one of the phase currents, respective reconstructed phase current magnitude values for the plurality of devices, and
        outputting the reconstructed phase current magnitude values;
    a reference frame translator configured to receive the output reconstructed phase current magnitude values and to generate an alpha-component and a beta-component of a reference frame of the stator;
    a stator current angle estimator configured to compute an estimate of the stator current angle in response to the alpha-component and the beta-component, and to provide the estimate of the stator current angle back to the phase current reconstructor; and
    a control signal generator configured to generate a set of control signals for the plurality of devices based on the reconstructed phase current magnitude values.

2. The system controller of claim 1, wherein the phase current reconstructor determines a sector and a sector angle in response to the stator current angle.

3. The system controller of claim 2, wherein the phase current reconstructor determines an index for the plurality of reference tables, wherein the index is substantially the difference between the stator current angle and the sector angle.

4. The system controller of claim 3, wherein the plurality of reference tables includes a first reference table, a second reference table, and a third reference table, and wherein the reconstruction scaling factors stored in the first reference table, the second reference table, and the third reference table are responsive to the index.

5. The system controller of claim 4, wherein the reconstruction scaling factors stored in the first reference table are substantially the sine of the sum of the index and one hundred twenty degrees divided by the sine of the index.

6. The system controller of claim 4, wherein the reconstruction scaling factors stored in the second reference table are substantially the sine of the difference of the index and one hundred twenty degrees divided by the sine of the index.

7. The system controller of claim 4, wherein the reconstruction scaling factors stored in the third reference table are substantially the sine of the index divided by the sine of the difference between the index and one hundred twenty degrees.

8. The system controller of claim 3, wherein the plurality of reference tables includes a first reference table and a second reference table, and wherein the reconstruction scaling factors stored in the first reference table and the second reference table are responsive to the index.

9. The system controller of claim 8, wherein the reconstruction scaling factors stored in the first reference table are substantially the sine of the sum of the index and sixty degrees divided by the sine of the difference between sixty degrees and the index.

10. The system controller of claim 8, wherein the reconstruction scaling factors stored in the second reference table are substantially the sine of the index divided by the sine of the sum of the index and sixty degrees.

11. The system controller of claim 1, wherein the stator current angle estimator comprises a phase-locked loop.

12. The system controller of claim 11, wherein the stator current angle estimator further comprises:
    a first multiplier configured to receive the beta-component and a cosine of the stator current angle and further configured to multiply the beta-component and the cosine of the stator current angle;
    a second multiplier configured to receive the alpha-component and a sine of the stator current angle and further configured to multiply the alpha-component and the sine of the stator current angle;
    a first arithmetic operator, configured to subtract an output of the second multiplier from an output of the first multiplier;
    a first amplifier configured to amplify an output of the first arithmetic operator with a gain Kp;
    a second amplifier configured to amplify the output of the first arithmetic operator with a gain Ki;
    a first integrator configured to integrate an output of the second amplifier;
    a second arithmetic operator configured to receive an output of the first amplifier and an output of the first integrator, wherein the second arithmetic operator adds the output of the first amplifier and the output of the first integrator; and a second integrator configured to form the estimate of the stator current angle by integrating an output of the second arithmetic operator.

13. The system controller of claim 1, further comprising a rotor position estimator configured to output a rotor angle representative of an angular position of a rotor flux vector in response to the alpha-component and the beta-component.

14. The system controller of claim 1, wherein the reference frame translator is configured to further translate the alpha-component and the beta-component to a quadrature-component and a direct-component, and wherein the quadrature-component and the direct-component correspond to a stationary-to-rotating frame transformation of the alpha-component and the beta-component.

15. The system controller of claim 14, further comprising:
a proportional-integrator control block configured to receive the quadrature-component, the direct-component, and an input representative of a property of the motor, wherein the proportional-integrator control block is configured to output a first control signal to regulate the quadrature-component and a second control signal to regulate the direct-component in response to the property of the motor; and
a second reference frame translator configured to receive the first control signal and the second control signal and output a plurality of control signals, wherein the plurality of control signals corresponds to a transformation of the first control signal and the second control signal from a rotating reference frame to a reference frame associated with the plurality of devices; and
wherein the control signal generator is further configured to regulate the phase current magnitudes through outputting the set of control signals for the plurality of devices in response to the plurality of control signals from the second reference frame translator.

16. The system controller of claim 13, further comprising:
a proportional-integrator control block configured to receive the rotor angle and an input representative of a property of the motor, wherein the proportional-integrator control block is configured to output a first control signal to regulate a quadrature-component and a second control signal to regulate a direct-component in response to the property of the motor and the rotor angle, wherein the quadrature-component and the direct-component correspond to a stationary-to-rotating frame transformation of the alpha-component and the beta-component; and
a second reference frame translator configured to receive the first control signal and the second control signal and output a plurality of control signals, wherein the plurality of control signals corresponds to a transformation of the first control signal and the second control signal from a rotating reference frame to a reference frame associated with the plurality of devices; and
wherein the control signal generator is further configured to regulate the phase current magnitudes through outputting the set of control signals for the plurality of devices in response to the plurality of control signals from the second reference frame translator.

17. A method for reconstructing a plurality of phase currents of a motor, the method comprising:
receiving a plurality of phase current sense signals including a respective phase current sense signal from each device of a plurality of devices that are operable to drive the motor;
determining a stator current angle, wherein determining the stator current angle comprises estimating the stator current angle from an alpha-component and a beta-component of a stator current vector, the alpha-component and the beta-component being based on reconstructed phase current magnitude values that were generated using one or more reconstruction scaling factors from a plurality of reference tables;
selecting, based on the stator current angle, one or more tables from among the plurality of reference tables;
obtaining a scaling factor from each table of the one or more tables, wherein each obtained scaling factor is a respective reconstruction scaling factor for one of the phase currents;
generating, based on each obtained scaling factor, respective reconstructed phase current magnitude values for the plurality of devices; and
outputting the respective reconstructed phase current magnitude values that were generated for the plurality of devices.

18. The method of claim 17, wherein selecting, based on the stator current angle, the one or more tables from among the plurality of reference tables comprises:
determining which one of the plurality of phase current sense signals is available; and
selecting the one or more tables based on the stator current angle and the one of the plurality of phase current sense signals that is available.

19. The method of claim 18, wherein determining which one of the plurality of phase current sense signals is available comprises:
comparing each phase current sense signal of the plurality of phase current sense signals with a respective threshold; and
determining that a phase current sense signal is available if the phase current sense signal is greater than its respective threshold.

20. The method of claim 17, wherein obtaining a scaling factor from each table of the one or more tables comprises:
determining, based on the stator current angle, a sector from a plurality of sectors of degrees;
determining a sector angle from the determined sector;
determining an index in response to a difference between the stator current angle and the sector angle; and
utilizing the index to obtain the scaling factor from each table of the one or more tables.

21. The method of claim 17, wherein generating respective reconstructed phase current magnitude values for the plurality of devices comprises:
determining which one of the plurality of phase current sense signals is available; and
multiplying an obtained scaling factor with the determined available phase current sense signal to produce a respective reconstructed phase current magnitude value for one of the plurality of devices.

* * * * *